(12) United States Patent
Mitsuhashi

(10) Patent No.: US 12,355,921 B2
(45) Date of Patent: Jul. 8, 2025

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Hiroyuki Mitsuhashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 461 days.

(21) Appl. No.: 17/699,154

(22) Filed: Mar. 20, 2022

(65) Prior Publication Data
US 2023/0100185 A1    Mar. 30, 2023

(30) Foreign Application Priority Data

Sep. 27, 2021 (JP) .................................. 2021-157292

(51) Int. Cl.
*H04M 3/00* (2024.01)
*H04M 3/56* (2006.01)
(Continued)

(52) U.S. Cl.
CPC ............ *H04M 3/568* (2013.01); *H04M 9/08* (2013.01); *H04W 4/12* (2013.01); *H04W 4/80* (2018.02); *H04W 68/005* (2013.01)

(58) Field of Classification Search
CPC ..... H04M 3/568; H04M 9/08; H04W 68/005; H04W 4/12; H04W 4/80
See application file for complete search history.

(56) References Cited

U.S. PATENT DOCUMENTS

2021/0136230 A1* 5/2021 Li .......................... H04R 3/02

FOREIGN PATENT DOCUMENTS

| JP | 2014-143534 | 8/2014 |
| JP | 2019-140517 | 8/2019 |

OTHER PUBLICATIONS

"Office Action of Japan Cpunterpart Application", issued on May 7, 2025, with English translation thereof, p. 1-p. 3.

* cited by examiner

*Primary Examiner* — Rasha S Al Aubaidi
(74) *Attorney, Agent, or Firm* — JCIPRNET

(57) ABSTRACT

A non-transitory computer readable medium storing a program causing a computer to execute a process is provided, the computer being included in a first information processing apparatus, and the process includes: (a) receiving notifications via a wireless communication channel from one or more information processing apparatuses other than the first information processing apparatus, each notification including conference identification information and information regarding a state of a sound-pick-up unit or a state of a sound-output unit of one of the one or more information processing apparatuses, the conference identification information identifying a teleconference to which the one of the one or more information processing apparatuses is to connect; (b) identifying an information processing apparatus as a nearby apparatus, the information processing apparatus being selected from the one or more information processing apparatuses that have transmitted the notifications received by the first information processing apparatus, the information processing apparatus having transmitted a notification including conference identification information that is the same as conference identification information of a teleconference to which the first information processing apparatus is to connect, the information processing apparatus being (Continued)

located at a distance from the first information processing apparatus, the distance being shorter than a predetermined distance; and (c) determining whether a howl is likely to occur by comparing a state of a sound-pick-up unit of the nearby apparatus that has been identified and a state of a sound-output unit of the first information processing apparatus or comparing a state of a sound-output unit of the nearby apparatus that has been identified and a state of a sound-pick-up unit of the first information processing apparatus.

20 Claims, 21 Drawing Sheets

(51) Int. Cl.
     *H04M 9/08*      (2006.01)
     *H04W 4/12*      (2009.01)
     *H04W 4/80*      (2018.01)
     *H04W 68/00*      (2009.01)

FIG. 11
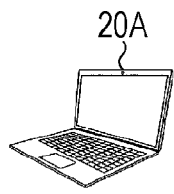
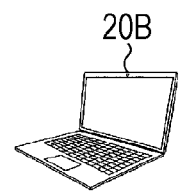
CONFERENCE TO ATTEND: CONFERENCE A
LOUDSPEAKER: ACTIVE
MICROPHONE: ACTIVE
CONFERENCE TO ATTEND: CONFERENCE A
LOUDSPEAKER: ACTIVE
MICROPHONE: INACTIVE
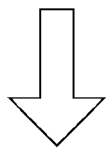
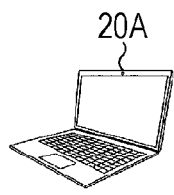
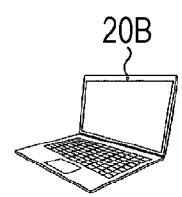
CONFERENCE TO ATTEND: CONFERENCE A
LOUDSPEAKER: ACTIVE
MICROPHONE: CHANGED FROM ACTIVE TO INACTIVE
CONFERENCE TO ATTEND: CONFERENCE A
LOUDSPEAKER: ACTIVE
MICROPHONE: INACTIVE

FIG. 14

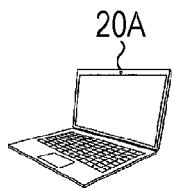
20A

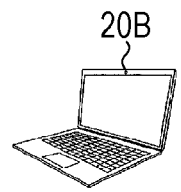
20B

CONFERENCE TO ATTEND: CONFERENCE A
LOUDSPEAKER:
OUTPUT INTENSITY LEVEL SET TO 8
MICROPHONE:
PICK UP SENSITIVITY LEVEL SET TO 8

CONFERENCE TO ATTEND: CONFERENCE A
LOUDSPEAKER:
OUTPUT INTENSITY LEVEL SET TO 10
MICROPHONE:
PICK UP SENSITIVITY LEVEL SET TO 0

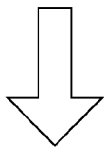

20A

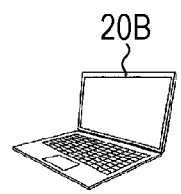
20B

CONFERENCE TO ATTEND: CONFERENCE A
LOUDSPEAKER:
OUTPUT INTENSITY LEVEL SET TO 8
MICROPHONE:
PICK UP SENSITIVITY LEVEL CHANGED FROM 8 TO 3

CONFERENCE TO ATTEND: CONFERENCE A
LOUDSPEAKER:
OUTPUT INTENSITY LEVEL SET TO 10
MICROPHONE:
PICK UP SENSITIVITY LEVEL SET TO 0

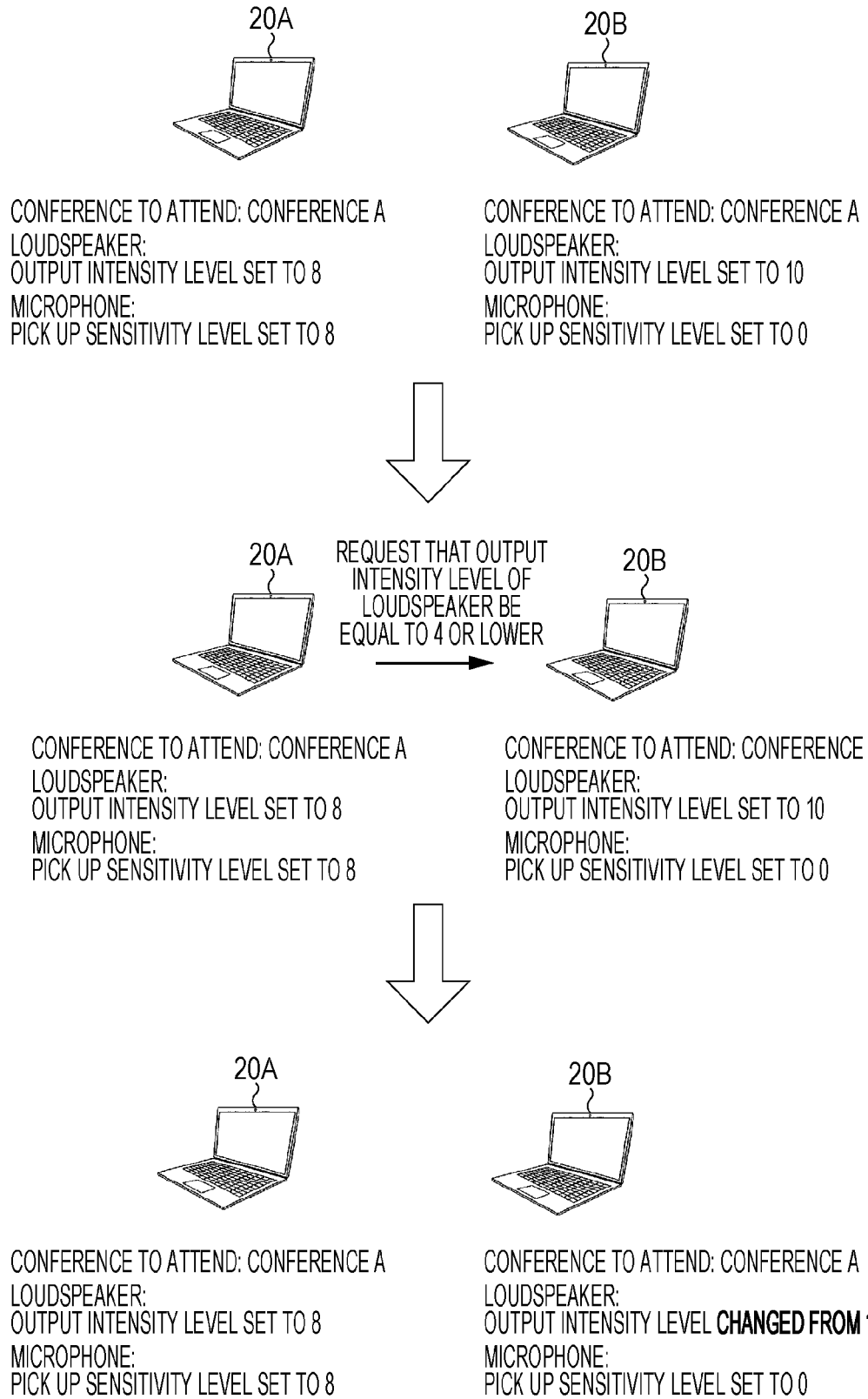

FIG. 16

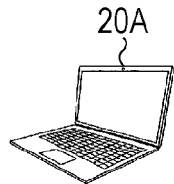
20A

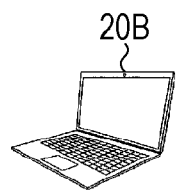
20B

CONFERENCE TO ATTEND: CONFERENCE A
LOUDSPEAKER:
OUTPUT INTENSITY LEVEL SET TO 8
MICROPHONE:
PICK UP SENSITIVITY LEVEL SET TO 8

CONFERENCE TO ATTEND: CONFERENCE A
LOUDSPEAKER:
OUTPUT INTENSITY LEVEL SET TO 10
MICROPHONE:
PICK UP SENSITIVITY LEVEL SET TO 0

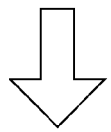

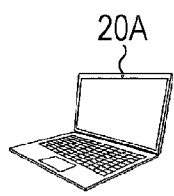
20A

REQUEST THAT OUTPUT
INTENSITY LEVEL OF
LOUDSPEAKER BE
EQUAL TO 6 OR LOWER

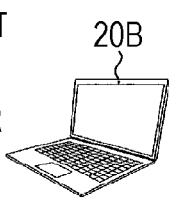
20B

CONFERENCE TO ATTEND: CONFERENCE A
LOUDSPEAKER:
OUTPUT INTENSITY LEVEL SET TO 8
MICROPHONE:
PICK UP SENSITIVITY LEVEL SET TO 8

CONFERENCE TO ATTEND: CONFERENCE A
LOUDSPEAKER:
OUTPUT INTENSITY LEVEL SET TO 10
MICROPHONE:
PICK UP SENSITIVITY LEVEL SET TO 0

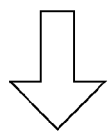

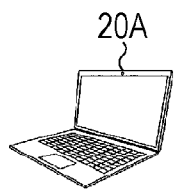
20A

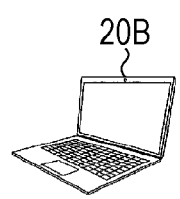
20B

CONFERENCE TO ATTEND: CONFERENCE A
LOUDSPEAKER:
OUTPUT INTENSITY LEVEL SET TO 8
MICROPHONE:
PICK UP SENSITIVITY LEVEL CHANGED FROM 8 TO 5

CONFERENCE TO ATTEND: CONFERENCE A
LOUDSPEAKER:
OUTPUT INTENSITY LEVEL CHANGED FROM 10 TO 6
MICROPHONE:
PICK UP SENSITIVITY LEVEL SET TO 0

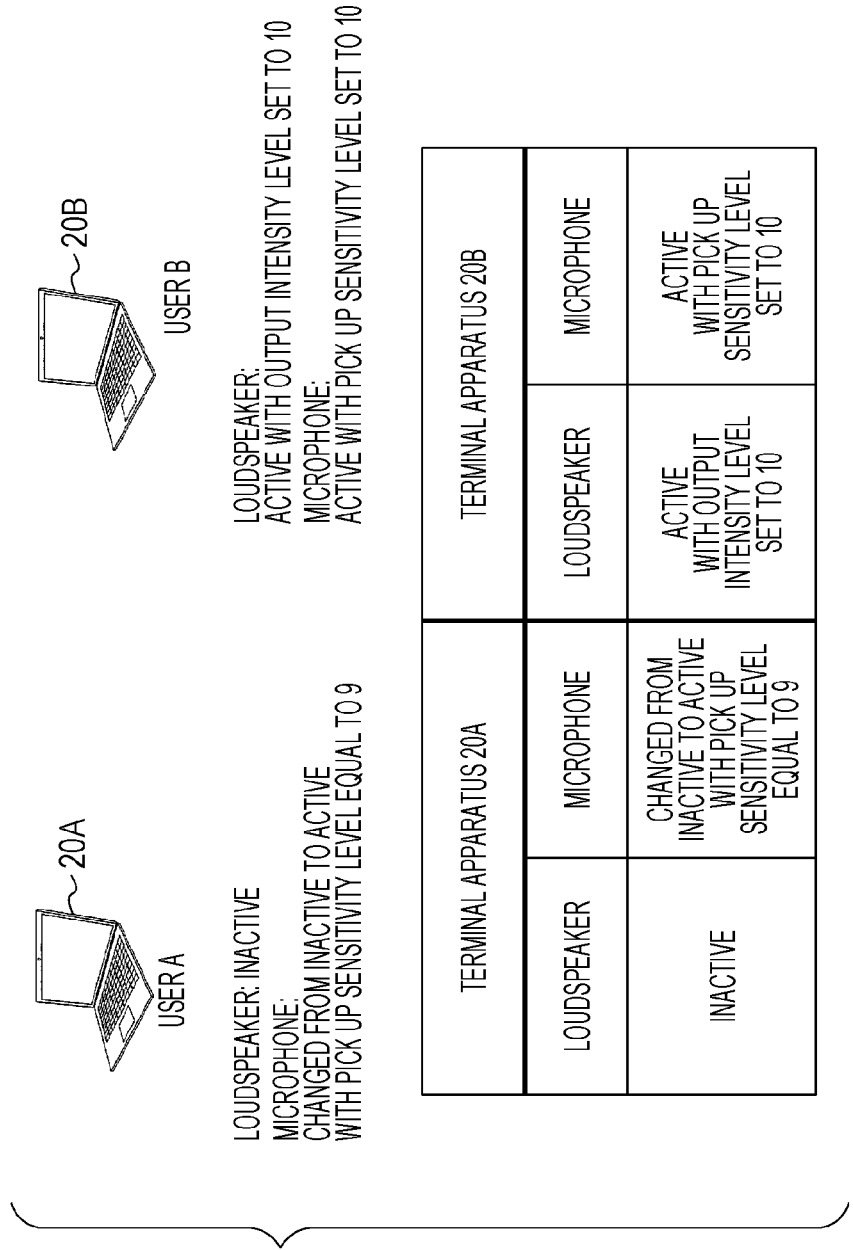

FIG. 18

| | CASE | PROCESSING FOR PREVENTING OR REDUCING HOWL | TERMINAL APPARATUS 20A | | TERMINAL APPARATUS 20B | |
|---|---|---|---|---|---|---|
| | | | LOUDSPEAKER | MICROPHONE | LOUDSPEAKER | MICROPHONE |
| 1 | TALKING CONTINUES AT TERMINAL APPARATUS 20B, AND STATES OF LOUDSPEAKER AND MICROPHONE OF TERMINAL APPARATUS 20B ARE TO BE MAINTAINED | PRIORITIZE (MAINTAIN) SETTING ON TERMINAL APPARATUS 20B AND CHANGE STATE OF MICROPHONE OF TERMINAL APPARATUS 20A | INACTIVE | ACTIVE WITH PICK UP SENSITIVITY LEVEL CHANGED FROM 9 TO 2 | ACTIVE | ACTIVE |
| 2 | THERE IS NO TALKING AT TERMINAL APPARATUS 20B, AND STATE OF TERMINAL APPARATUS 20A, AT WHICH TALKING IS TO START, IS TO BE PRIORITIZED | CHANGE STATE OF TERMINAL APPARATUS 20B AND PRIORITIZE (MAINTAIN) STATE OF TERMINAL APPARATUS 20A | INACTIVE | ACTIVE | ACTIVE WITH OUTPUT INTENSITY LEVEL CHANGED FROM 10 TO 3 IN RESPONSE TO INSTRUCTION FROM TERMINAL APPARATUS 20A | ACTIVE |
| 3 | USABILITY OF TERMINAL APPARATUSES 20A AND 20B IS TO BE KEPT IN BALANCE BY CHANGING STATES OF BOTH TERMINAL APPARATUSES | CHANGE STATES OF BOTH TERMINAL APPARATUSES 20A AND 20B | INACTIVE | ACTIVE WITH PICK UP SENSITIVITY LEVEL CHANGED FROM 9 TO 4 | ACTIVE WITH OUTPUT INTENSITY LEVEL CHANGED FROM 10 TO 5 IN RESPONSE TO INSTRUCTION FROM TERMINAL APPARATUS 20A | ACTIVE |

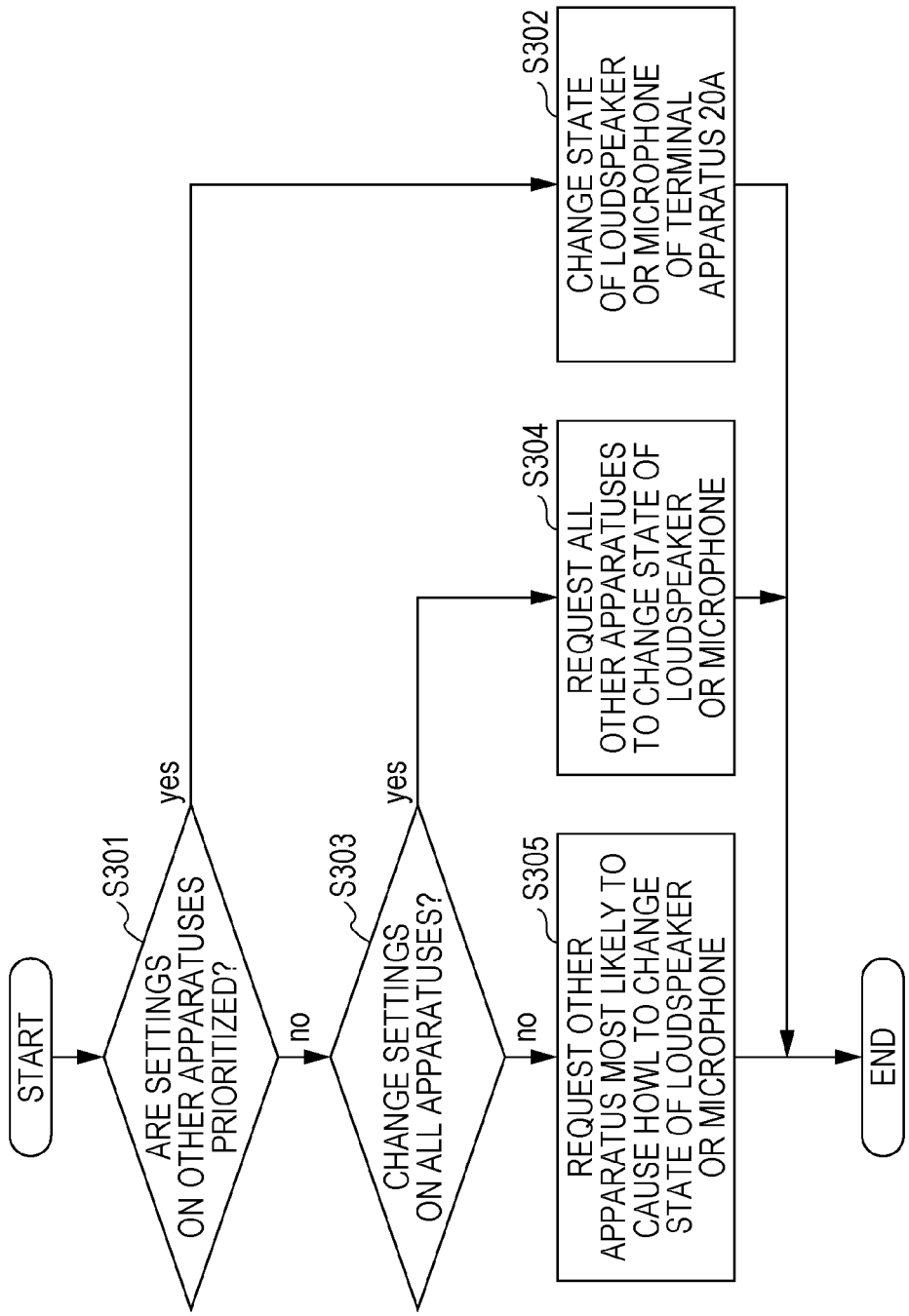

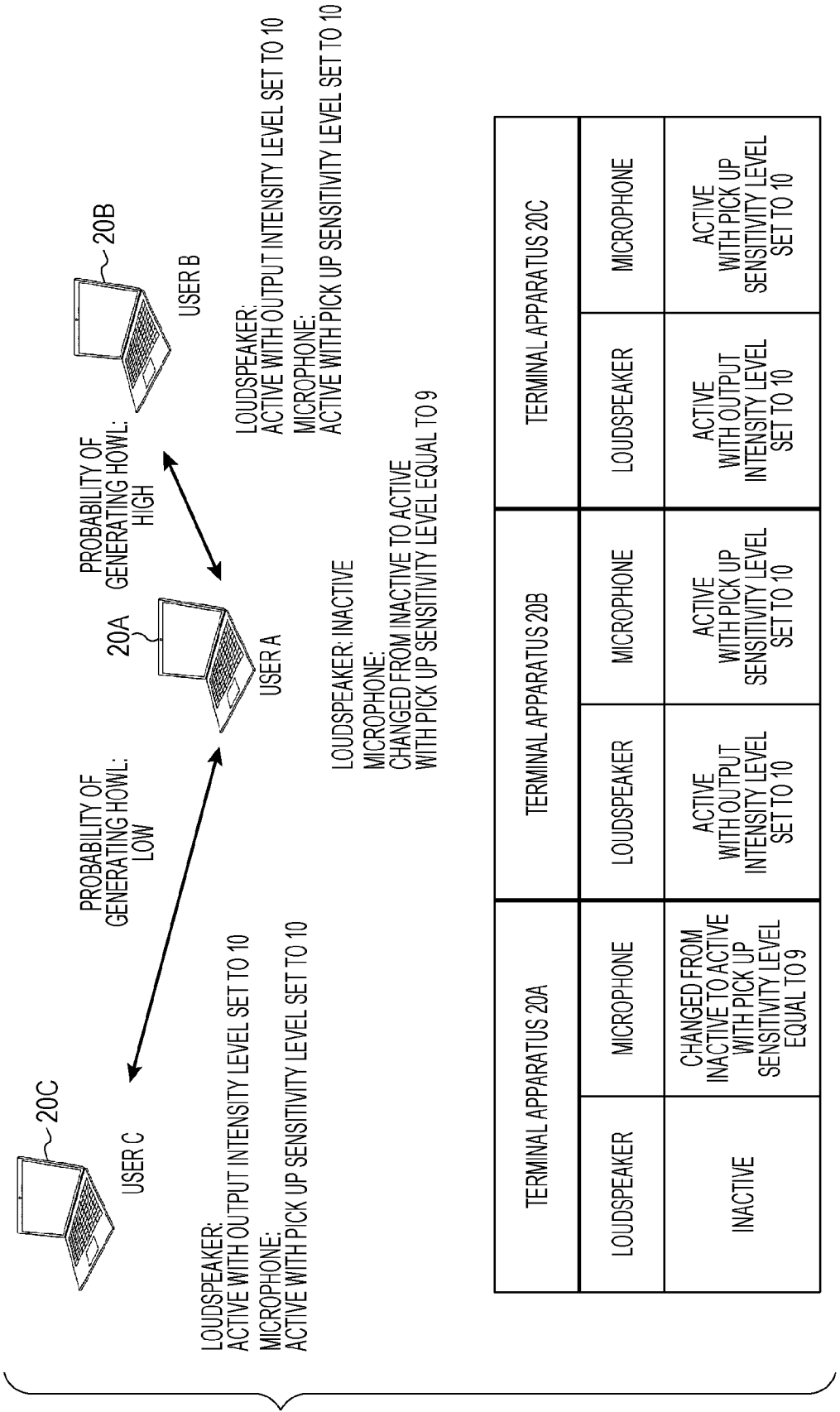

FIG. 21

| # | CASE | | PROCESSING FOR PREVENTING OR REDUCING HOWL | TERMINAL APPARATUS 20A | | TERMINAL APPARATUS 20B | | TERMINAL APPARATUS 20C | |
|---|---|---|---|---|---|---|---|---|---|
| | | | | LOUDSPEAKER | MICROPHONE | LOUDSPEAKER | MICROPHONE | LOUDSPEAKER | MICROPHONE |
| 1 | TALKING CONTINUES AT TERMINAL APPARATUSES OTHER THAN TERMINAL APPARATUS 20A, AND STATES OF LOUDSPEAKERS AND MICROPHONES OF TERMINAL APPARATUSES OTHER THAN TERMINAL APPARATUS 20A ARE TO BE MAINTAINED | | PRIORITIZE (MAINTAIN) SETTINGS ON TERMINAL APPARATUSES 20B AND 20C AND CHANGE STATE OF MICROPHONE OF TERMINAL APPARATUS 20A | INACTIVE | ACTIVE WITH PICK UP SENSITIVITY LEVEL CHANGED FROM 9 TO 2 | ACTIVE | ACTIVE | ACTIVE | ACTIVE |
| 2 | THERE IS NO TALKING AT TERMINAL APPARATUSES OTHER THAN TERMINAL APPARATUS 20A, AND STATE OF TERMINAL APPARATUS 20A, AT WHICH TALKING IS TO START, IS TO BE PRIORITIZED | RESTRICT TERMINAL APPARATUS WHOSE STATE IS TO BE CHANGED | CHANGE STATE OF TERMINAL APPARATUS 20B, WHICH IS MOST LIKELY TO CAUSE HOWL AND PRIORITIZE (MAINTAIN) STATE OF TERMINAL APPARATUS 20A | INACTIVE | ACTIVE | ACTIVE WITH OUTPUT INTENSITY LEVEL CHANGED FROM 10 TO 3 | ACTIVE | ACTIVE | ACTIVE |
| 3 | | OPTIMIZE STATES OF ALL TERMINAL APPARATUSES | CHANGE STATES OF ALL TERMINAL APPARATUSES 20B AND 20C EXCEPT TERMINAL APPARATUS 20A | INACTIVE | ACTIVE | ACTIVE WITH OUTPUT INTENSITY LEVEL CHANGED FROM 10 TO 4 | ACTIVE | ACTIVE WITH OUTPUT INTENSITY LEVEL CHANGED FROM 10 TO 4 | ACTIVE |
| 4 | USABILITY OF ALL TERMINAL APPARATUSES IS TO BE KEPT IN BALANCE BY CHANGING STATES OF ALL TERMINAL APPARATUSES 20A, 20B, AND 20C | | CHANGE STATES OF ALL TERMINAL APPARATUSES 20A TO 20C | INACTIVE | ACTIVE WITH PICK UP SENSITIVITY LEVEL CHANGED FROM 9 TO 3 | ACTIVE WITH OUTPUT INTENSITY LEVEL CHANGED FROM 10 TO 5 | ACTIVE | ACTIVE WITH OUTPUT INTENSITY LEVEL CHANGED FROM 10 TO 5 | ACTIVE |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-157292 filed Sep. 27, 2021.

BACKGROUND

(i) Technical Field

The present disclosure relates to an information processing apparatus, an information processing method, and a non-transitory computer readable medium.

(ii) Related Art

Japanese Unexamined Patent Application Publication No. 2014-143534 discloses a transmission management apparatus configured to acquire positional information of multiple transmission terminals connected to a video conference to be held by using the multiple transmission terminals and provide instructions for muting a transmission terminal if the transmission terminal is disposed at a distance from another transmission terminal that is equal to or shorter than a threshold.

Japanese Unexamined Patent Application Publication No. 2019-140517 discloses a system including multiple information processing apparatuses and a server apparatus, wherein the multiple information processing apparatuses are used in a web conference and each configured to transmit to the server apparatus an audio signal representing a sound that has been picked up, the server apparatus is configured to transmit an audio signal received from an information processing apparatus to the other information processing apparatuses, and each of the information processing apparatuses does not output a sound represented by a received audio signal if the received audio signal has been transmitted by another information processing apparatus disposed in the same room as the information processing apparatus.

SUMMARY

Aspects of non-limiting embodiments of the present disclosure relate to providing an information processing apparatus, an information processing method, and a non-transitory computer readable medium that are capable of preventing or reducing generation of a howl caused by two or more information processing apparatuses located in close proximity to each other when a teleconference is held by exchanging audio data among multiple information processing apparatuses via a network.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a non-transitory computer readable medium storing a program causing a computer to execute a process, the computer being included in a first information processing apparatus, and the process includes:

(a) receiving notifications via a wireless communication channel from one or more information processing apparatuses other than the first information processing apparatus, each notification including conference identification information and information regarding a state of a sound-pick-up unit or a state of a sound-output unit of one of the one or more information processing apparatuses, the conference identification information identifying a teleconference to which the one of the one or more information processing apparatuses is to connect;

(b) identifying an information processing apparatus as a nearby apparatus, the information processing apparatus being selected from the one or more information processing apparatuses that have transmitted the notifications received by the first information processing apparatus, the information processing apparatus having transmitted a notification including conference identification information that is the same as conference identification information of a teleconference to which the first information processing apparatus is to connect, the information processing apparatus being located at a distance from the first information processing apparatus, the distance being shorter than a predetermined distance; and (c) determining whether a howl is likely to occur by comparing a state of a sound-pick-up unit of the nearby apparatus that has been identified and a state of a sound-output unit of the first information processing apparatus or comparing a state of a sound-output unit of the nearby apparatus that has been identified and a state of a sound-pick-up unit of the first information processing apparatus.

BRIEF DESCRIPTION OF THE DRAWINGS

An exemplary embodiment of the present disclosure will be described in detail based on the following figures, wherein:

FIG. 11 is an illustration depicting an example of control for preventing or reducing generation of a howl by prioritizing the setting on a terminal apparatus other than the terminal apparatus configured to perform the processing depicted in FIG. 9;

FIG. 14 is an illustration depicting an example of control for preventing or reducing generation of a howl based on a level adjustment by prioritizing the setting on a terminal apparatus other than the terminal apparatus configured to perform the processing depicted in FIG. 9;

FIG. 15 is an illustration depicting an example of control for preventing or reducing generation of a howl based on a level adjustment by prioritizing the setting on the terminal apparatus configured to perform the processing depicted in FIG. 9;

FIG. 16 is an illustration depicting an example of control for preventing or reducing generation of a howl based on a level adjustment on both the terminal apparatus configured to perform the processing depicted in FIG. 9 and the other apparatus;

FIG. 17 is an illustration for describing a first example of a specific control pattern in an actual usage condition;

FIG. 18 is an illustration for describing processing for preventing or reducing a howl in each case in the first example of a specific control pattern in an actual usage condition;

FIG. 19 is a flowchart for describing details of step S107 in the flowchart depicted in FIG. 9 when generation of a howl is to be prevented or reduced for three or more terminal apparatuses;

FIG. 20 is an illustration for describing a second example of a specific control pattern in an actual usage condition; and FIG. 21 is an illustration for describing processing for preventing or reducing a howl in each case in the second example of a specific control pattern in an actual usage condition.

DETAILED DESCRIPTION

An exemplary embodiment of the present disclosure will be described in detail with reference to the drawings.

Figure 1:
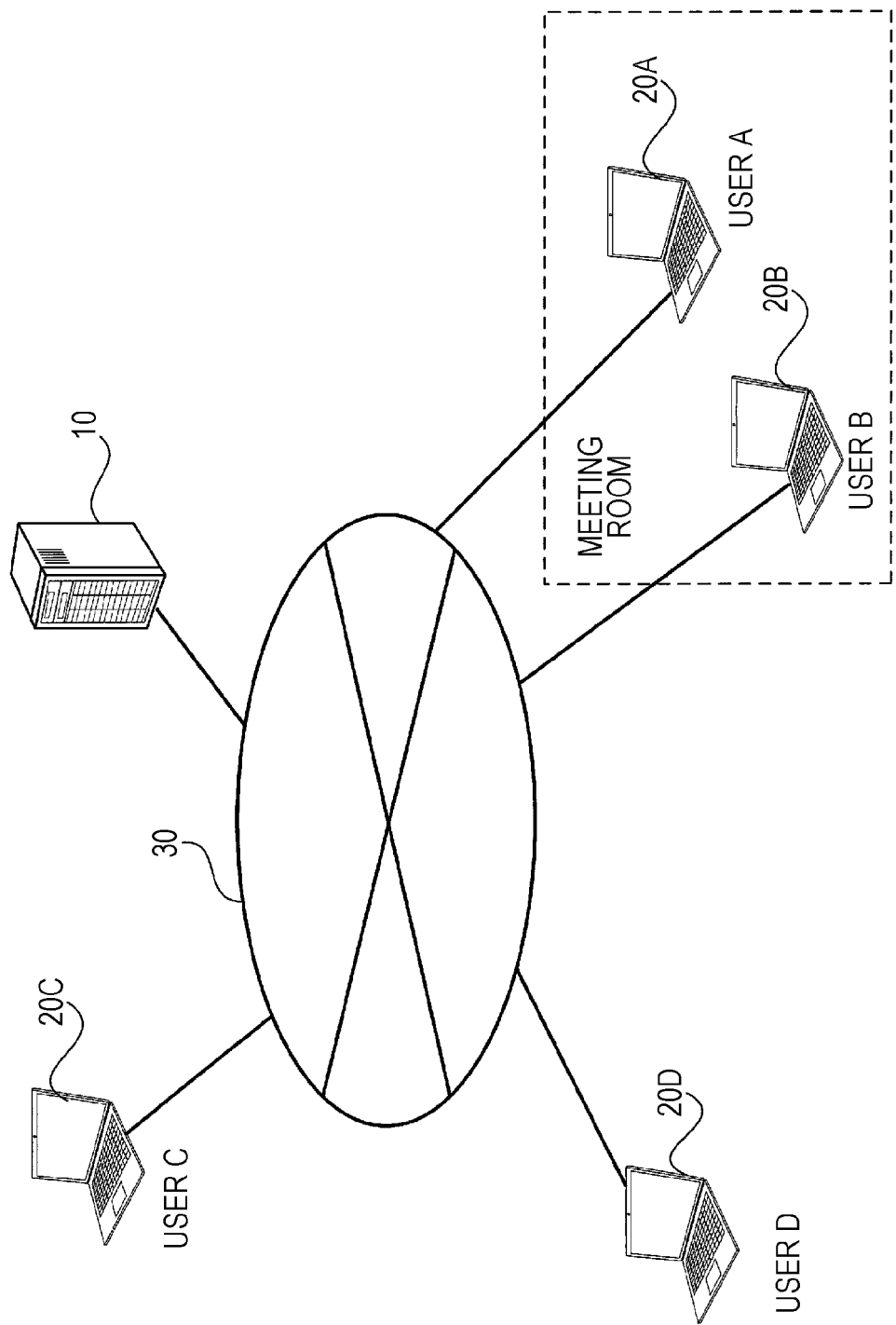
FIG. 1 is an illustration depicting a system configuration of a web conference system according to the exemplary embodiment of the present disclosure.

FIG. 1 is an illustration depicting a system configuration of a web conference system according to the exemplary embodiment of the present disclosure.

The web conference system according to the exemplary embodiment of the present disclosure is formed by multiple terminal apparatuses 20A to 20D and a web conference management server 10 that are connected to each other by using the Internet 30 as depicted in FIG. 1.

The web conference system depicted in FIG. 1 is used to hold a web conference, which is a teleconference, based on exchanges of audio and video data between multiple information processing apparatuses 20A to 20D via a network such as the Internet 30.

The terminal apparatuses 20A to 20D are used by users A to D, respectively, and each of the terminal apparatuses 20A to 20D is, for example, an information processing apparatus such as a notebook personal computer. Accordingly, the users A to D are able to move to various locations and attend a web conference.

The web conference management server 10 is configured to manage a web conference held by connecting the multiple terminal apparatuses 20A to 20D, issue a conference identifier (ID), which is conference identification information for identifying a web conference, and perform control to hold a web conference.

A web conference application program (abbreviated to app below) is installed on each of the terminal apparatuses 20A to 20D. Each of the terminal apparatuses 20A to 20D launches this web conference app to connect to a web conference.

Although it is possible for the terminal apparatuses 20A to 20D each disposed at a different location to connect to a web conference, a web conference is also held by connecting sites in some cases. In such a case, multiple participants gather at a certain site such as a meeting room and attend the web conference.

However, when multiple users gather at a single site to attend a single web conference, a phenomenon called a howl is likely to occur.

Figure 2:
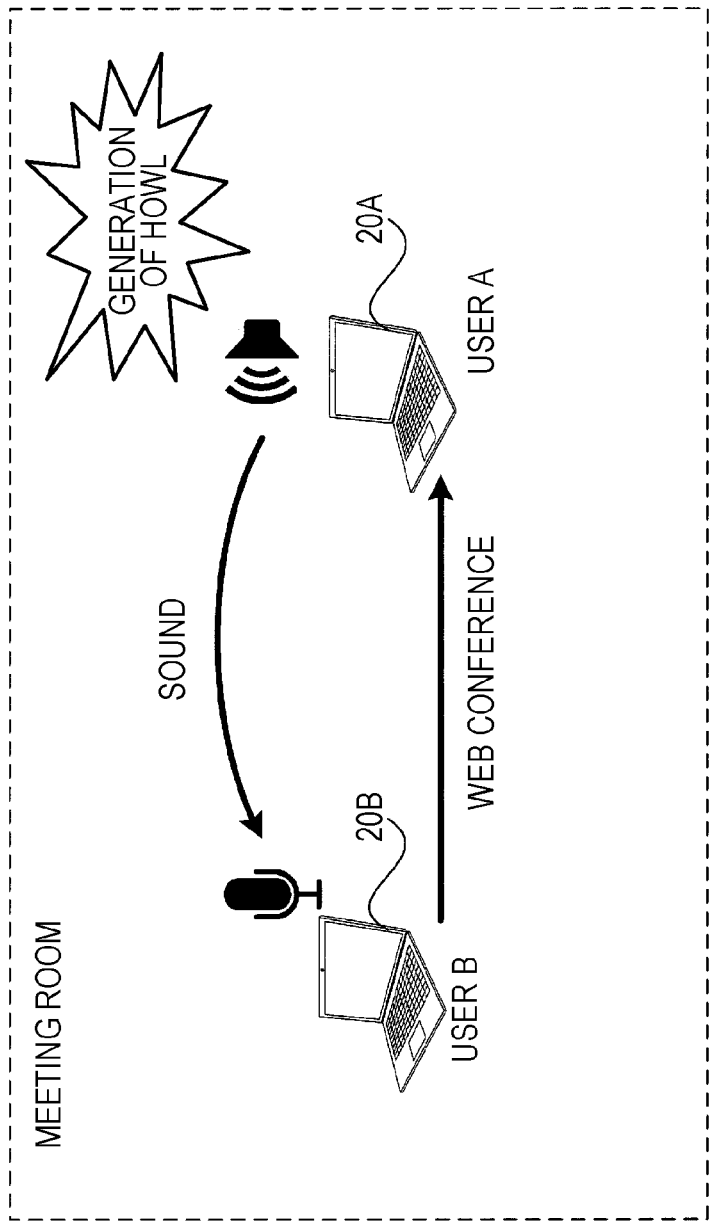
FIG. 2 is an illustration for describing a mechanism by which a howl occurs.

Next, a mechanism by which a howl occurs will be described with reference to FIG. 2.

For example, description will be given with regard to a situation in which the terminal apparatuses 20A and 20B, which are connected to a single web conference, are located in a single meeting room. In such a situation, if a microphone of the terminal apparatus 20B is active while a loudspeaker of the terminal apparatus 20A is active, it is possible that the microphone of the terminal apparatus 20B picks up a sound that is output from the loudspeaker of the terminal apparatus 20A. When a web conference starts, a sound picked up by the microphone of the terminal apparatus 20B is sent as audio data to the terminal apparatus 20A via the web conference management server 10 and output from the loudspeaker as a sound. As a result, an audio information loop is formed between the terminal apparatuses 20A and 20B, and if the loop gain is equal to or larger than 1, an oscillation occurs, causing a phenomenon called a howl, which generates an extraordinary sound.

When multiple participants gather in a single meeting room and hold a web conference, a howl occurs if a sound is output from a loudspeaker for the conference and the loudspeaker for the conference is located in close proximity to a microphone of a terminal apparatus.

Generation of such a howl hinders a normal exchange of voices during a web conference. Consequently, if two or more terminal apparatuses are located in close proximity at a single site such as a meeting room, a web conference cannot be held in a normal condition without preventing or reducing generation of a howl.

Thus, a web conference system according to the present exemplary embodiment is configured to perform control described below and prevent or reduce generation of a howl caused by two or more terminal apparatuses located in close proximity to each other while a teleconference such as a web conference is held.

Figure 3:
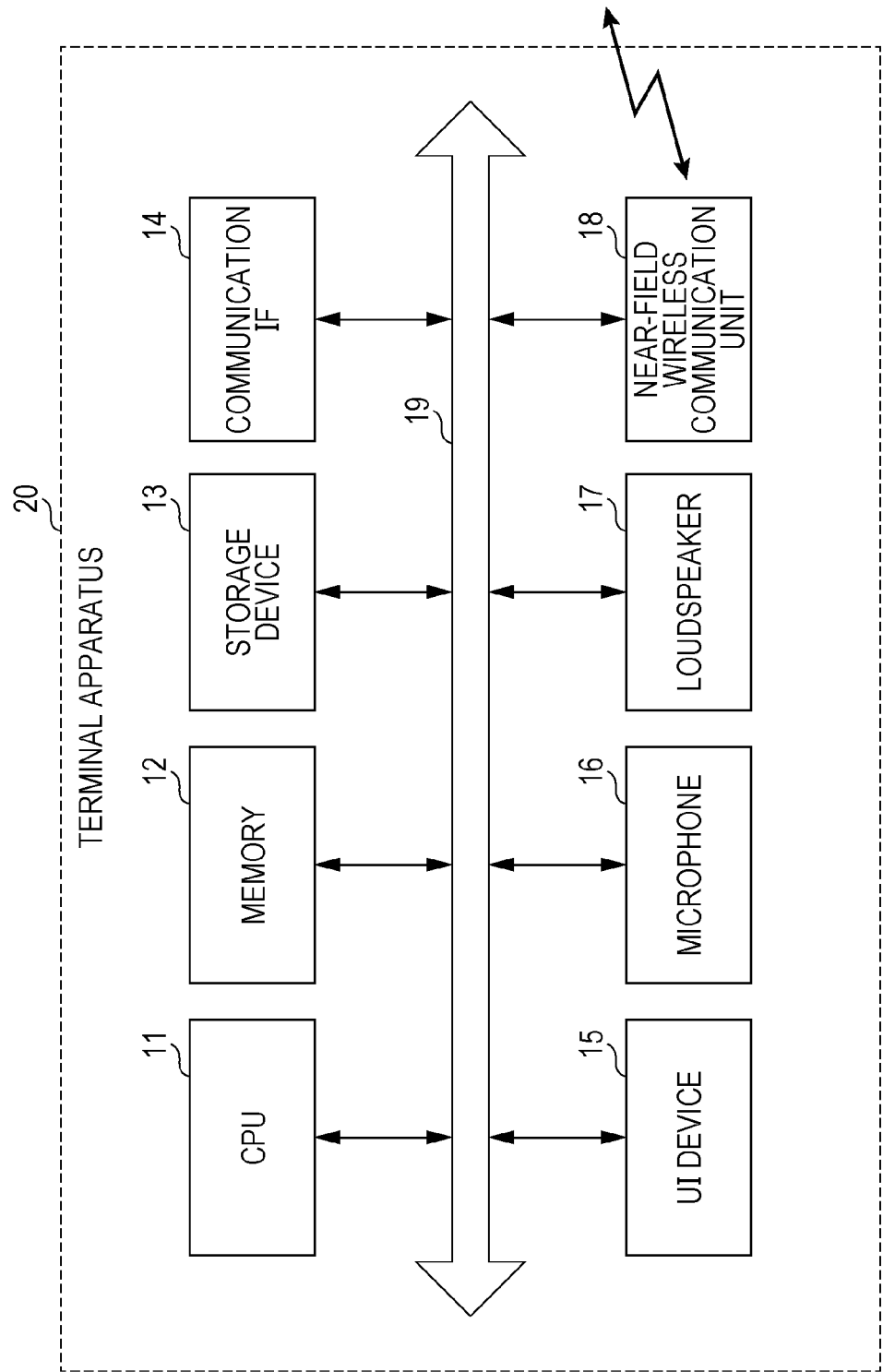
FIG. 3 is an illustration depicting a hardware configuration of a terminal apparatus according to the exemplary embodiment of the present disclosure.

Next, a hardware configuration of a terminal apparatus 20 according to the present exemplary embodiment is depicted in FIG. 3. When one of the terminal apparatuses 20A to 20D is referred to and which of the terminal apparatuses is not specified, the terminal apparatus is simply denoted by a terminal apparatus 20.

As depicted in FIG. 3, the terminal apparatus 20 includes a central processing unit (CPU) 11, a memory 12, a storage device 13 such as a hard disk drive, a communication interface (abbreviated to IF) 14 that transmits and receives data to and from an external apparatus and the like via the Internet 30, a user-interface (abbreviated to UI) device 15 including a touch panel or a combination of a liquid crystal display and a keyboard, a microphone 16 configured to function as a sound-pick-up unit, a loudspeaker 17 configured to function as a sound-output unit, and a near-field wireless communication unit 18 configured to transmit and receive data via a wireless communication channel based on a standard such as Bluetooth (registered trademark). These components are connected to each other by using a control bus 19.

The communication IF 14 may have a function of connecting to the Internet 30 by using a wireless local area network (LAN) such as WiFi (registered trademark).

The CPU 11 is a processor configured to perform predetermined processing based on a control program stored in the memory 12 or in the storage device 13 and control operation of the terminal apparatus 20. Although the description in the present exemplary embodiment will be given on the assumption that the CPU 11 reads and executes the control program stored in the memory 12 or in the storage device 13, it is also possible to provide the CPU 11 with the program stored in a storage medium such as a compact-disc read-only memory (CD-ROM).

Next, description will be given with reference to the flowchart in FIG. 4 with regard to processing for preventing or reducing generation of a howl performed when a web conference app is to start a web conference on a terminal apparatus 20 according to the present exemplary embodiment.

In step S101, the CPU 11 of the terminal apparatus 20 first receives an advertisement signal from a terminal apparatus other than the terminal apparatus 20 via a near-field wireless communication channel such as Bluetooth (registered trademark). The advertisement signal is a notification including a conference ID and information regarding the state of the microphone or the state of the loudspeaker of the terminal apparatus other than the terminal apparatus 20. The conference ID identifies a web conference to which the terminal apparatus other than the terminal apparatus 20 is to connect.

Figure 5:
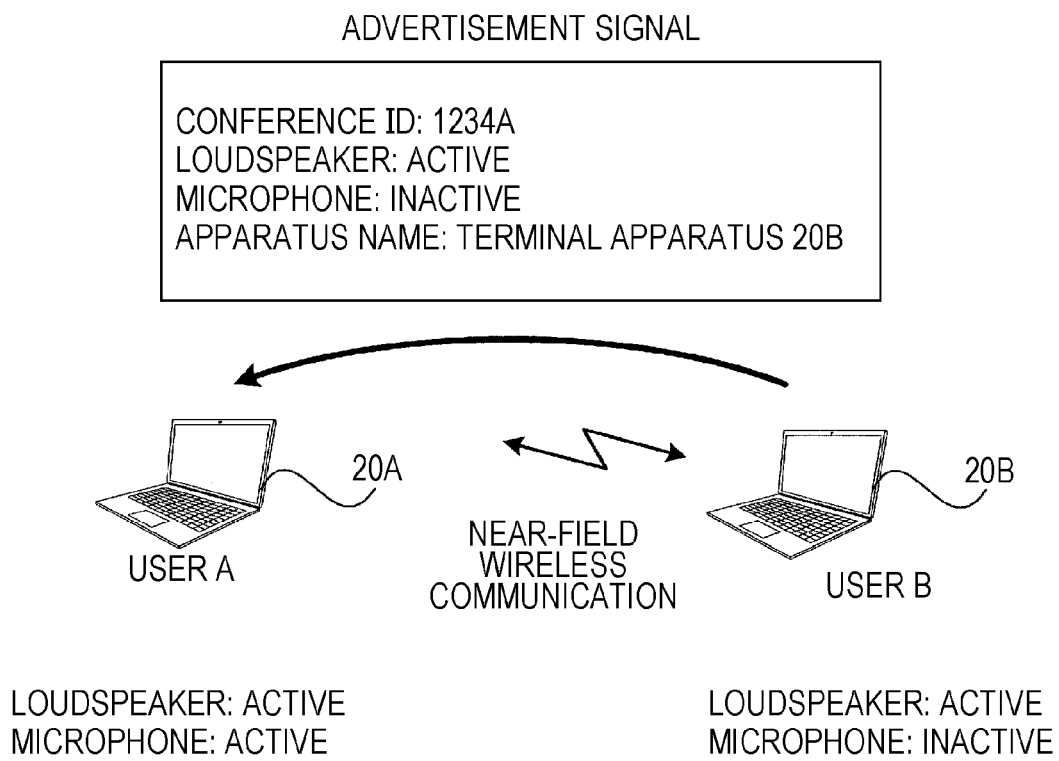
FIG. 5 is an illustration depicting a situation in which an advertisement signal transmitted by a terminal apparatus is received by another terminal apparatus.

FIG. 5 depicts a situation in which an advertisement signal transmitted by the terminal apparatus 20B is received by the terminal apparatus 20A.

FIG. 5 indicates that an advertisement signal is transmitted by the terminal apparatus 20B to the terminal apparatus 20A via a near-field wireless communication channel. It can be seen that the advertisement signal includes a conference ID, which is conference identification information, information regarding the state of the loudspeaker, which indicates that the loudspeaker is active, information regarding the state of the microphone, which indicates that the microphone is inactive, and the apparatus name of the terminal apparatus 20B, which is information uniquely assigned to each apparatus. It is assumed that a conference ID "1234A" represents a conference named "conference A" to be held.

Upon receiving such an advertisement signal from the terminal apparatus 20B, the terminal apparatus 20A is able to identify the state of the loudspeaker and the state of the microphone of the terminal apparatus 20B and a conference that the user B is to attend. Although description will be given below with regard to only processing to be performed by the terminal apparatus 20A, similar processing is to be performed by the other terminal apparatuses, such as the terminal apparatus 20B.

Next, in steps S102 to S104, the CPU 11 of the terminal apparatus 20A identifies a terminal apparatus 20 as a nearby apparatus. The terminal apparatus 20 is selected from the terminal apparatuses 20 that have transmitted advertisement signals received by the terminal apparatus 20A. The advertisement signal received from the terminal apparatus 20 includes a conference ID that is the same as the conference ID of a web conference to which the terminal apparatus 20A is to connect, and the terminal apparatus 20 is located at a distance from the terminal apparatus 20A, the distance being shorter than a predetermined distance.

Specifically, in step S102, the CPU 11 first determines whether the conference ID included in the received advertisement signal coincides with the conference ID of a conference to which the terminal apparatus 20A is to connect. In step S102, if it is determined that the conference ID included in the received advertisement signal does not coincide with the conference ID of the conference to which the terminal apparatus 20A is to connect, the CPU 11 finishes the processing and waits for another advertisement signal to be received.

If it is determined in step S102 that the conference ID included in the received advertisement signal coincides with the conference ID of the conference to which the terminal apparatus 20A is to connect, the CPU 11 measures the distance between the terminal apparatus that has transmitted the advertisement signal and the terminal apparatus 20A based on the intensity of a received electromagnetic wave in the near-field wireless communication (step S103).

The actual distance between the terminal apparatus that has transmitted the advertisement signal and the terminal apparatus 20A need not accurately be measured. Instead, it may be determined whether the distance is in the long-distance range or in the short-distance range based on whether the intensity of a received electromagnetic wave is equal to a threshold or higher or whether the intensity is lower than the threshold. Alternatively, three or more distance ranges may be adopted to measure the distance instead of using the two distance ranges, that is, the long-distance and short-distance ranges.

The method of measuring the distance between the terminal apparatus 20A and the other apparatus is not limited to the measurement method based on the intensity of a received electromagnetic wave in the near-field wireless communication. Various measurement methods including a position measurement method using a global positioning system (GPS), a position measurement method using a beacon signal, and a measurement method based on the intensity of a received electromagnetic wave in a wireless communication channel other than the near-field wireless communication channel may be used.

Then, in step S104, the CPU 11 determines whether the measured distance between the terminal apparatuses is shorter than a threshold. If the CPU 11 determines in step S104 that the measured distance between the terminal apparatuses is equal to the threshold or longer, the CPU 11 finishes the processing and waits for another advertisement signal to be received.

If the CPU 11 determines in step S104 that the measured distance between the terminal apparatuses is shorter than the threshold, the CPU 11 determines in step S105 whether a howl is likely to occur.

In summary, the CPU 11 of the terminal apparatus 20A identifies as a nearby apparatus a terminal apparatus having transmitted an advertisement signal including a conference ID that is the same as the conference ID of a web conference to which the terminal apparatus 20A is to connect if the distance between the terminal apparatus and the terminal apparatus 20A is shorter than a predetermined distance. Then, the CPU 11 determines whether a howl is likely to be caused by the identified nearby apparatus and the terminal apparatus 20A. If the intensity of an electromagnetic wave in the near-field wireless communication channel received from a terminal apparatus is lower than a predetermined threshold, the CPU 11 of the terminal apparatus 20A identifies the terminal apparatus as a terminal apparatus located at a distance from the terminal apparatus 20A, the distance being shorter than a predetermined distance.

The CPU 11 of the terminal apparatus 20A compares the state of the microphone of the identified nearby apparatus and the state of the loudspeaker of the terminal apparatus 20A or compares the state of the loudspeaker of the identified nearby apparatus and the state of the microphone of the terminal apparatus 20A and determines whether a howl is likely to occur.

Specifically, the information that is included in the advertisement signal and that concerns the state of the microphone includes information indicating whether the microphone is active or inactive, and the information that is included in the advertisement signal and that concerns the state of the loudspeaker includes information indicating whether the loudspeaker is active or inactive. The CPU 11 of the terminal apparatus 20A determines that a howl is likely to occur if the microphone of the identified nearby apparatus and the loudspeaker of the terminal apparatus 20A are both active or the loudspeaker of the identified nearby apparatus and the microphone of the terminal apparatus 20A are both active.

Figure 6:
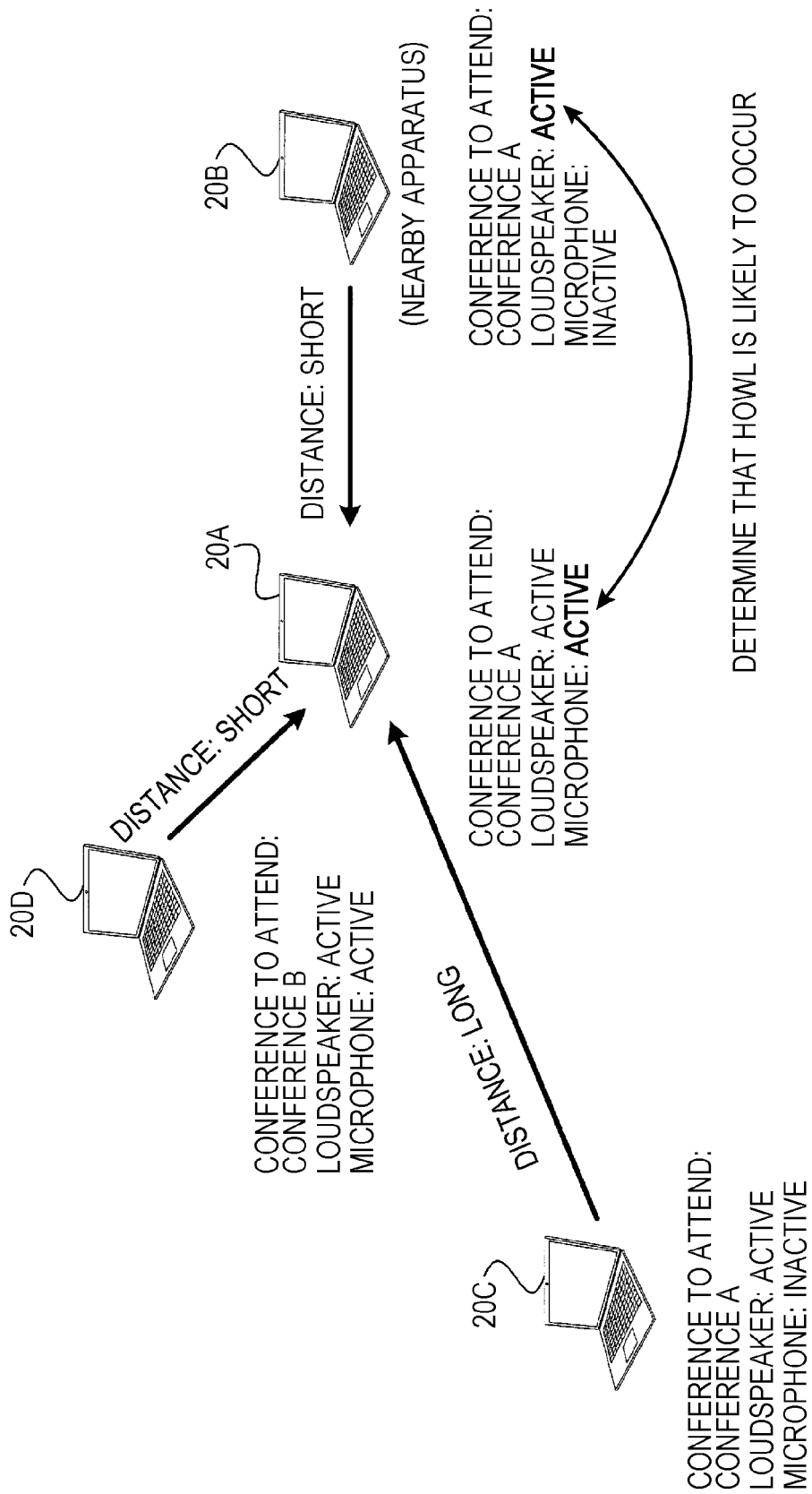
FIG. 6 is an illustration for describing a specific example of processing for determining whether a howl is likely to occur.

Description will be given with reference to FIG. 6 with regards to a specific example of processing performed in this way to determine whether a howl is likely to occur.

A case where the terminal apparatuses 20B to 20D are located around the terminal apparatus 20A will be described with reference to FIG. 6. Referring to FIG. 6, the terminal apparatus 20C is not identified as a nearby apparatus because the distance between the terminal apparatuses 20A and 20C is long. In addition, although being located in close proximity to the terminal apparatus 20A, the terminal apparatus 20D is not identified as a nearby apparatus because the user D of the terminal apparatus 20D is to attend a conference B and the advertisement signal transmitted by the terminal apparatus 20D includes a conference ID different from the conference ID of the conference A.

However, the terminal apparatus 20B is identified as a nearby apparatus because the user B of the terminal apparatus 20B is to attend the conference A and the terminal apparatus 20B is located in close proximity to the terminal apparatus 20A with the distance between the terminal apparatus 20B and the terminal apparatus 20A being short. Further, since the loudspeaker of the terminal apparatus 20B is active and the microphone of the terminal apparatus 20A is active, the CPU 11 of the terminal apparatus 20A determines that a howl is likely to occur if a web conference starts without changing this condition.

If the CPU 11 determines in step S105 that there is no possibility that a howl is caused by the terminal apparatus 20A and the nearby apparatus, the CPU 11 finishes the processing and waits for another advertisement signal to be received.

If the CPU 11 determines in step S105 that a howl is likely to be caused by the terminal apparatus 20A and the nearby apparatus, the CPU 11 warns the user that a howl is likely to occur (step S106).

Figure 7:
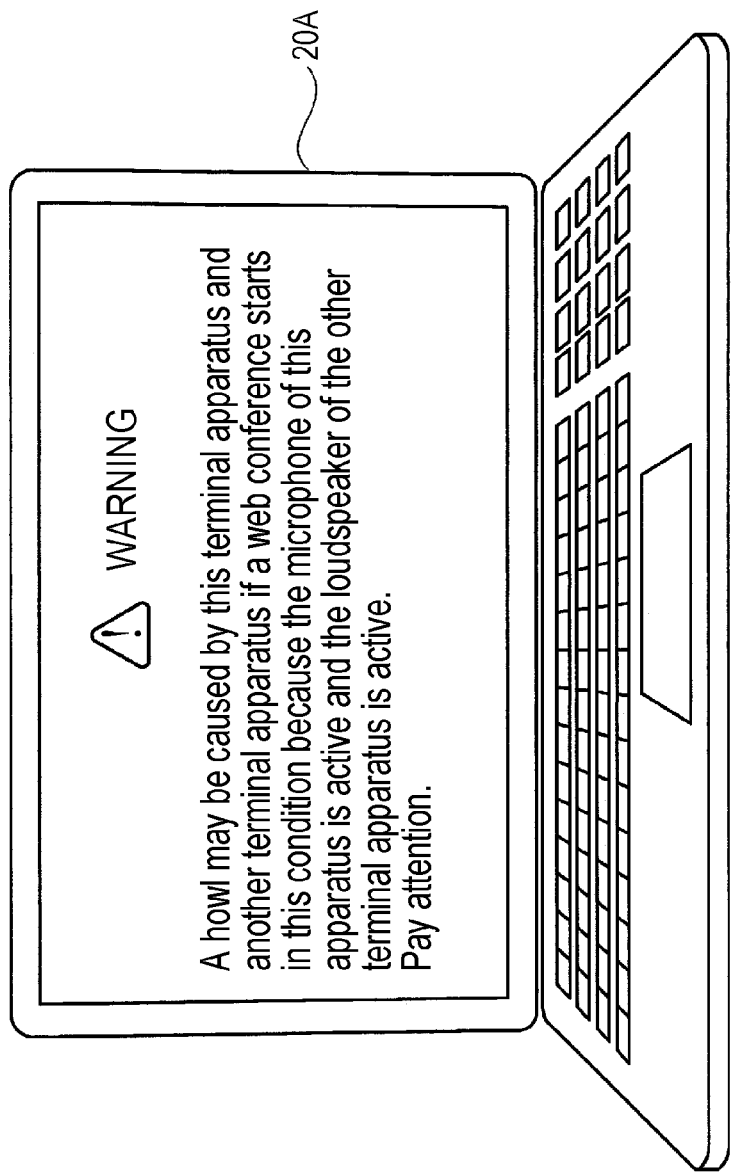
FIG. 7 is an illustration depicting an example of a warning display screen presented when it is determined that a howl is likely to occur.
Figure 8:
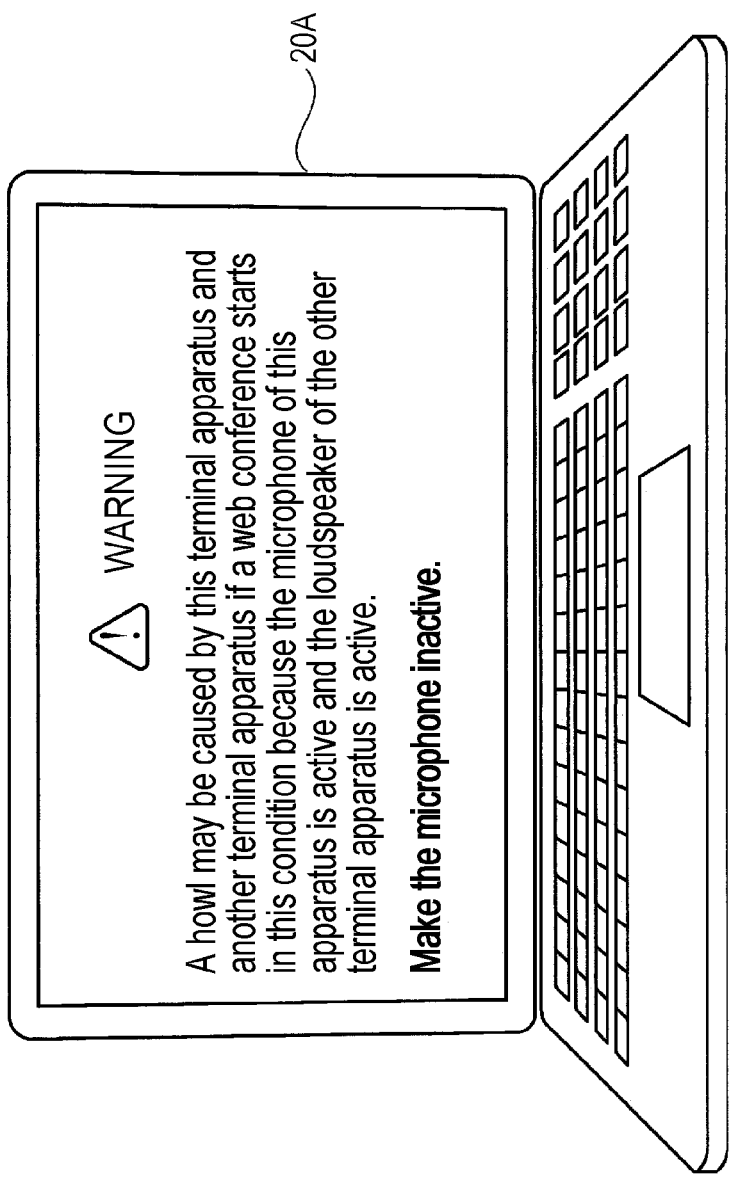
FIG. 8 is an illustration depicting an example of a warning display screen presented when it is determined that a howl is likely to occur.

FIGS. 7 and 8 each depict an example of a warning display screen presented when it is determined that a howl is likely to occur.

Referring to FIG. 7, a message that reads "A howl may be caused by this terminal apparatus and another terminal apparatus if a web conference starts in this condition." is presented on a display screen of the terminal apparatus 20A, and the user is warned.

Further, referring to FIG. 8, a message that reads "Make the microphone inactive." is presented in addition to the above warning, and specific processing for preventing or reducing generation of a howl is presented to the user.

The terminal apparatus 20A may not only present the warning message described above on the display screen of the terminal apparatus 20A but also request the terminal apparatus 20B, which is the other apparatus identified as likely to generate a howl, to present a warning message on a display screen.

Figure 4:
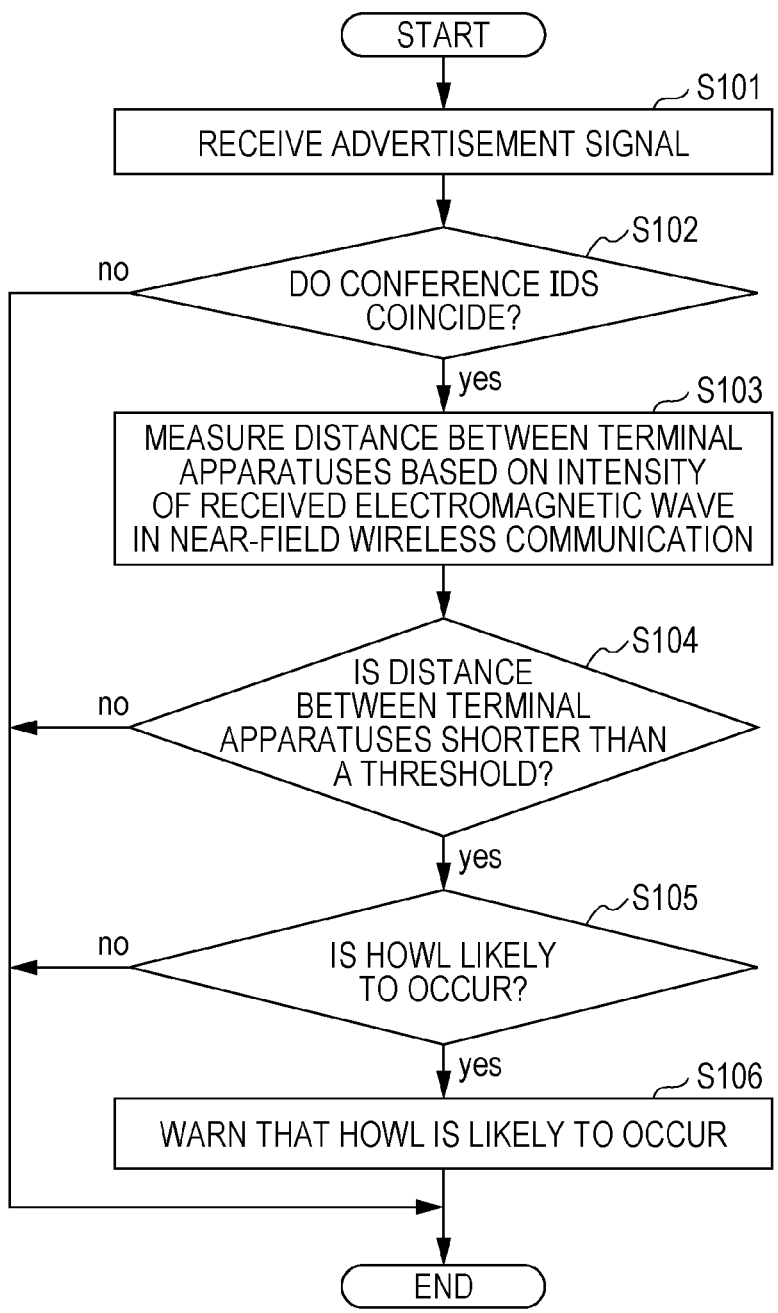
FIG. 4 is a flowchart for describing processing performed by the terminal apparatus according to the exemplary embodiment of the present disclosure to prevent or reduce generation of a howl.

When a howl is likely to occur, the user is only warned of the possibility of generation of a howl in the flowchart depicted in FIG. 4. The CPU 11 may be allowed to perform processing for preventing or reducing generation of a howl when it is determined that a howl is likely to occur.

Figure 9:
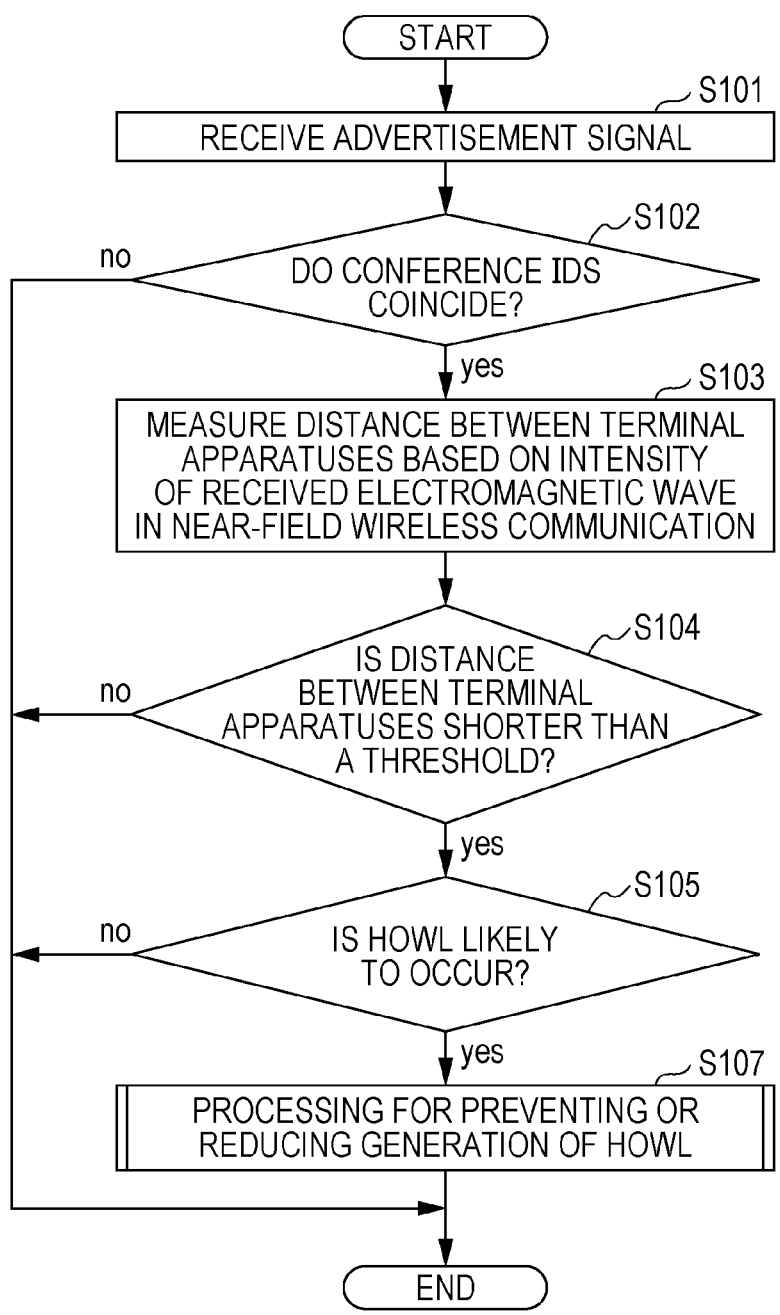
FIG. 9 is a flowchart for describing processing performed by a terminal apparatus configured to conduct processing for preventing or reducing generation of a howl when it is determined that a howl is likely to occur.

A flowchart in FIG. 9 depicts a process that includes processing to be performed to prevent or reduce generation of a howl when it is determined that a howl is likely to occur.

In the flowchart depicted in FIG. 9, processing in step S106 in the flowchart depicted in FIG. 4 is replaced with processing in step S107. Thus, the processing in steps S101 to S105 will not be described.

If the CPU 11 determines in step S105 that a howl is likely to occur, the CPU 11 performs the processing for preventing or reducing generation of a howl in step S107.

Figure 10:
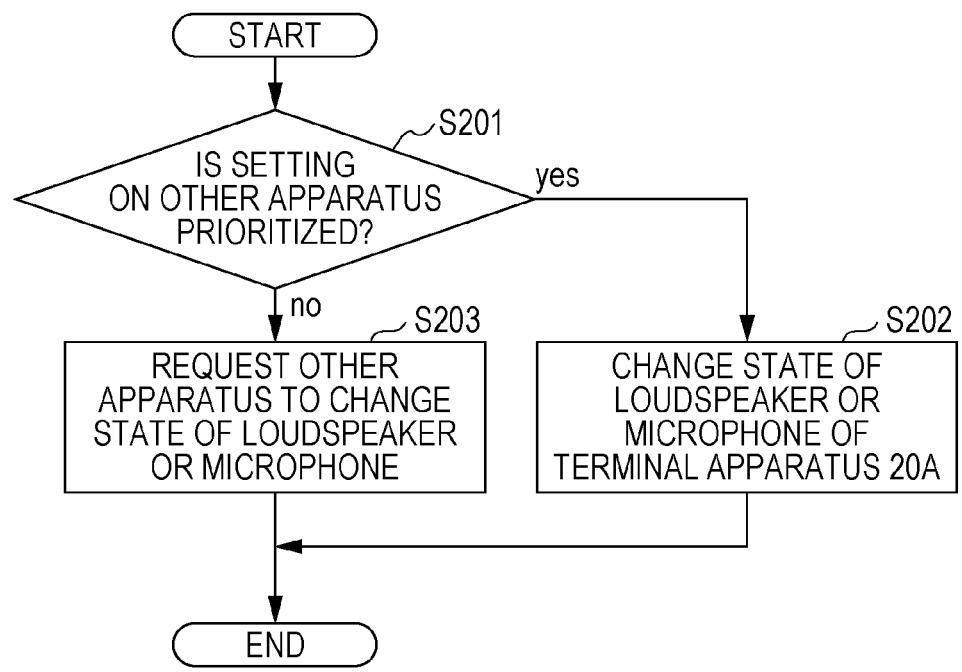
FIG. 10 is a flowchart depicting details of processing in step S107 depicted in the flowchart in FIG. 9.

Details of the processing in step S107 is depicted by the flowchart in FIG. 10.

In step S201, the CPU 11 of the terminal apparatus 20A first determines whether to prioritize the setting on a terminal apparatus other than the terminal apparatus 20A or prioritize the setting on the terminal apparatus 20A. Prioritizing the setting specifically means prioritizing the state of a loudspeaker or the state of a microphone.

The CPU 11 of the terminal apparatus 20A may switch between prioritizing the setting on the terminal apparatus 20A and prioritizing the setting on a terminal apparatus other than the terminal apparatus 20A. Alternatively, when it is determined that a howl is likely to occur, the CPU 11 of the terminal apparatus 20A may prevent or reduce generation of a howl by presenting a selection screen on the display screen and allowing the user to provide an input for selecting whether to change the state of the microphone or the state of the loudspeaker of the terminal apparatus 20A or whether to change the state of the microphone or the state of the loudspeaker of the other terminal apparatus, which is a nearby apparatus.

Alternatively, the CPU 11 of the terminal apparatus 20A may prevent or reduce generation of a howl by prioritizing the terminal apparatus 20A or the nearby apparatus, whichever has more recently changed the state of the microphone or the state of the loudspeaker, and changing the state of the microphone or the state of the loudspeaker of an apparatus that gets lower priority.

Further, the CPU 11 of the terminal apparatus 20A may prevent or reduce generation of a howl by assigning each of the terminal apparatuses 20 a priority level in advance, prioritizing the terminal apparatus 20A or the nearby apparatus, whichever has a higher priority level assigned in advance, and changing the state of the microphone or the state of the loudspeaker of an apparatus assigned a lower priority level.

Further, the CPU 11 of the terminal apparatus 20A may prevent or reduce generation of a howl by identifying the terminal apparatus 20A or the nearby apparatus, whichever is to be prioritized, based on the characteristic information regarding the microphone being used or the characteristic information regarding the loudspeaker being used and changing the state of the microphone or the state of the loudspeaker of an apparatus that gets lower priority.

Specifically, the CPU 11 of the terminal apparatus 20A identifies as an apparatus to be prioritized the terminal apparatus 20A or the nearby apparatus, whichever uses a microphone externally connected or a loudspeaker externally connected, and prevents or reduces generation of a howl by changing the state of the microphone or the state of the loudspeaker of an apparatus that gets lower priority.

For example, when a microphone or a loudspeaker for a conference is shared by multiple users in a single meeting room, changing a microphone function or a loudspeaker function of a terminal apparatus to which the shared microphone or the shared loudspeaker is connected may cause trouble for a web conference. Thus, a terminal apparatus to which an external microphone or an external loudspeaker is connected is identified as an apparatus to be prioritized, and control is performed to maintain the setting on the terminal apparatus as much as possible to increase the possibility of preventing the entire web conference from being affected.

If characteristic information regarding the microphone or the loudspeaker of each terminal apparatus 20 includes, for example, "microphone (for PC)" or "loudspeaker (for PC)", it can be determined that a built-in microphone or a built-in loudspeaker is used. If the characteristic information includes, for example, "microphone (USB connection)", "microphone (for conference), or "loudspeaker (external connection)", it can be determined that a microphone externally connected or a loudspeaker externally connected is used.

If the CPU 11 of the terminal apparatus 20A has determined in step S201, which is described above, to prioritize the setting on a terminal apparatus other than the terminal apparatus 20A, the CPU 11 of the terminal apparatus 20A prevents or reduces generation of a howl by changing the state of the microphone or the state of the loudspeaker of the terminal apparatus 20A to inactive in step S202.

For example, FIG. 11 depicts an example of control in a case of prioritizing the setting on a terminal apparatus other than the terminal apparatus 20A.

In the example of control depicted in FIG. 11, the microphone of the terminal apparatus 20A is active, and the loudspeaker of the terminal apparatus 20B is active. Consequently, it is determined that a howl is likely to occur. Thus, the terminal apparatus 20A prevents or reduces generation of a howl by changing the state of the microphone of the terminal apparatus 20A from active to inactive. In this case, the setting on the terminal apparatus 20B is maintained and unchanged.

Further, if the CPU 11 of the terminal apparatus 20A has determined in step S201, which is described above, not to prioritize the setting on a terminal apparatus other than the terminal apparatus 20A, the CPU 11 of the terminal apparatus 20A requests a nearby apparatus, which is identified as likely to generate a howl, to change the state of the microphone or the state of the loudspeaker to inactive to prevent or reduce generation of a howl in step S203.

Then, the terminal apparatus 20 that has received the request to change the state of the microphone or the state of the loudspeaker to inactive performs processing for changing the state of the microphone or the state of the loudspeaker to inactive, and generation of a howl is prevented or reduced.

Figure 12:
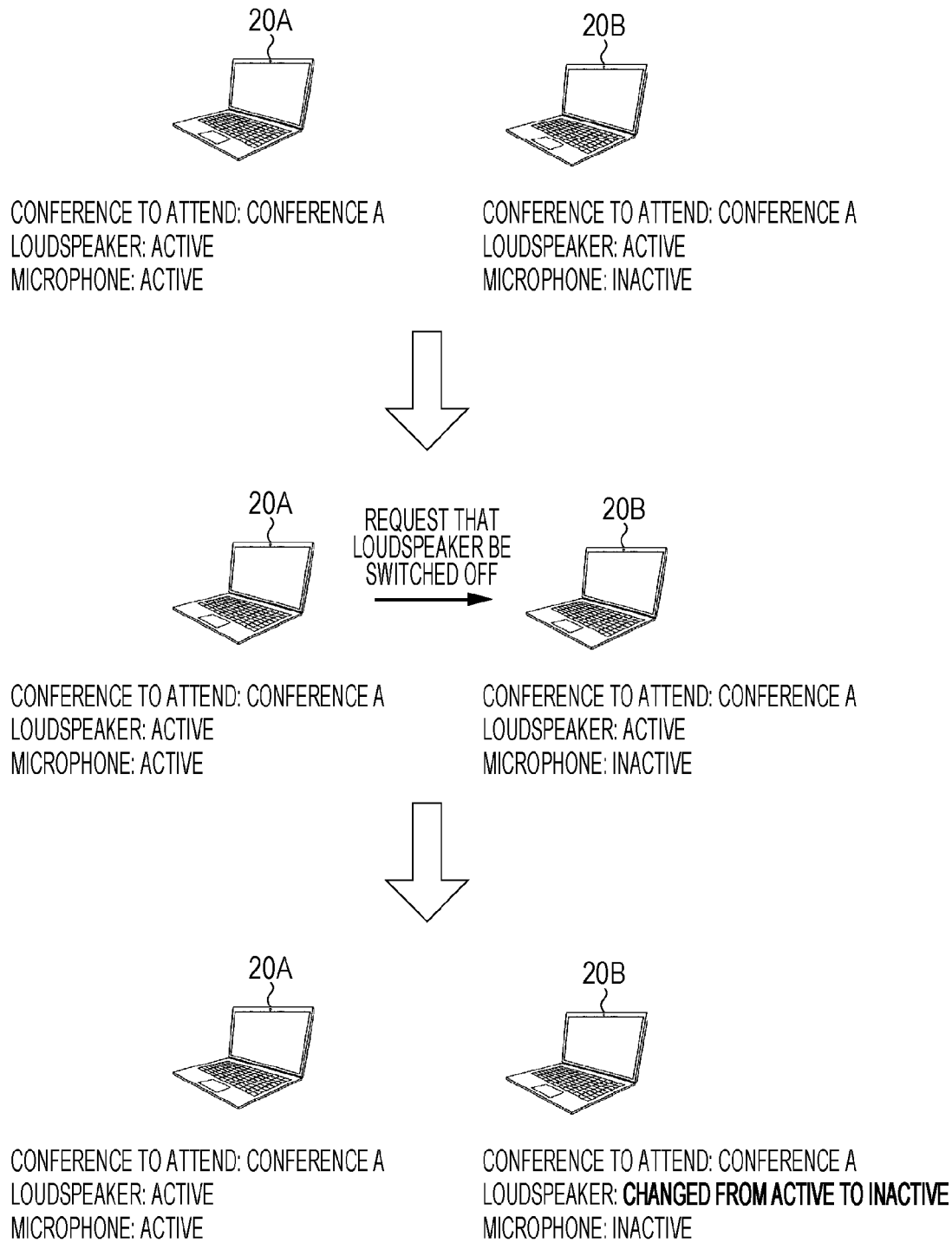
FIG. 12 is an illustration depicting an example of control for preventing or reducing generation of a howl by prioritizing the setting on the terminal apparatus configured to perform the processing depicted in FIG. 9.

For example, FIG. 12 depicts an example of control in a case of prioritizing the setting on the terminal apparatus 20A.

In the example of control depicted in FIG. 12, the microphone of the terminal apparatus 20A is active, and the loudspeaker of the terminal apparatus 20B is active. Consequently, it is determined that a howl is likely to occur. Thus, the terminal apparatus 20A transmits to the terminal apparatus 20B a request to switch off the loudspeaker via the near-field wireless communication channel. Then, upon receiving this request, the terminal apparatus 20B changes the state of the loudspeaker of the terminal apparatus 20B from active to inactive to prevent or reduce generation of a howl. In this case, the setting on the terminal apparatus 20A is maintained and unchanged.

In the above examples, description has been given with regard to the cases where generation of a howl is prevented or reduced by switching between the active state and the inactive state of the microphone or the loudspeaker. It is also possible to prevent or reduce generation of a howl by adjusting the pick up sensitivity level of a microphone or the output intensity level of a loudspeaker.

In the following examples, description will be given with regard to cases where generation of a howl is prevented or reduced by adjusting the pick up sensitivity level of a microphone or the output intensity level of a loudspeaker. In the following examples, description will be given on the assumption that the pick up sensitivity level of a microphone is adjustable in the range of 0 to 10 and that the output intensity level of a loudspeaker is adjustable in the range of 0 to 10. When the pick up sensitivity level of a microphone is 0, the microphone is inactive. When the output intensity level of a loudspeaker is 0, the loudspeaker is inactive.

First of all, to prevent or reduce generation of a howl by adjusting the pick up sensitivity level of a microphone or the output intensity level of a loudspeaker, an advertisement signal includes, as information regarding the state of a microphone, information representing pick up sensitivity of the microphone, such as information regarding the pick up sensitivity level of the microphone. Similarly, the advertisement signal includes, as information regarding the state of a loudspeaker, information representing output intensity of the loudspeaker, such as information regarding the output intensity level of the loudspeaker.

Figure 13:
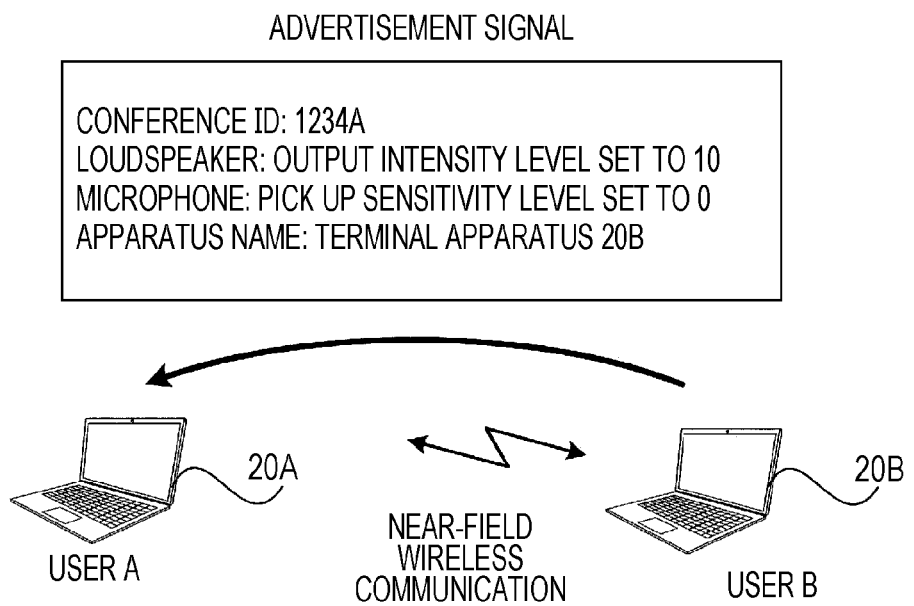
FIG. 13 is an illustration depicting a situation in which an advertisement signal including the output intensity level of a loudspeaker and the pick up sensitivity level of a microphone is transmitted by a terminal apparatus to another terminal apparatus.

FIG. 13 depicts a situation in which an advertisement signal including the output intensity level of a loudspeaker and the pick up sensitivity level of a microphone is transmitted by the terminal apparatus 20B to the terminal apparatus 20A.

Referring to FIG. 13, it can be seen that an advertisement signal transmitted by the terminal apparatus 20B to the terminal apparatus 20A includes, in addition to information such as a conference ID, information indicating that the output intensity level of the loudspeaker is "10" and information indicating that the pick up sensitivity level of the microphone is "0".

The CPU 11 of the terminal apparatus 20A determines whether a howl is likely to occur, and the determination is based on the relationship between the pick up sensitivity level of the microphone of the identified nearby apparatus and the output intensity level of the loudspeaker of the terminal apparatus 20A or the relationship between the output intensity level of the loudspeaker of the identified nearby apparatus and the pick up sensitivity level of the microphone of the terminal apparatus 20A.

Various methods may be used to determine what kind of relationship between the output intensity level of a loudspeaker and the pick up sensitivity level of a microphone is required for two terminal apparatuses 20 to determine that a howl is likely to occur. For example, as the simplest method, it may be determined that a howl is likely to occur when the sum of the output intensity level of a loudspeaker and the pick up sensitivity level of a microphone is equal to or larger than a predetermined value, for example, 14. Other methods may be used to determine that a howl is likely to occur. Further, the intensity of a received electromagnetic wave in the near-field wireless communication may also be included in determining that a howl is likely to occur.

When adjusting the output intensity level of a loudspeaker and the pick up sensitivity level of a microphone to prevent or reduce generation of a howl, the CPU 11 of the terminal apparatus 20A also performs different control depending on whether to prioritize the setting on an apparatus other than the terminal apparatus 20A or prioritize the setting on the terminal apparatus 20A.

FIG. 14 depicts an example of control for preventing or reducing generation of a howl based on level adjustment by prioritizing the setting on a terminal apparatus other than the terminal apparatus 20A.

When preventing or reducing generation of a howl while prioritizing the setting on a terminal apparatus other than the terminal apparatus 20A, the CPU 11 of the terminal apparatus 20A changes the pick up sensitivity level of the microphone or the output intensity level of the loudspeaker of the terminal apparatus 20A to prevent or reduce generation of a howl.

For example, in the example of control depicted in FIG. 14, the pick up sensitivity level of the microphone of the terminal apparatus 20A is 8, and the output intensity level of the loudspeaker of the terminal apparatus 20B is 10. Consequently, it is determined that a howl is likely to occur. In this case, the CPU 11 of the terminal apparatus 20A prevents or reduces generation of a howl by lowering the pick up sensitivity level of the microphone of the terminal apparatus 20A, for example, from 8 to 3.

Next, FIG. 15 depicts an example of control for preventing or reducing generation of a howl based on level adjustment by prioritizing the setting on the terminal apparatus 20A.

When preventing or reducing generation of a howl while prioritizing the setting on the terminal apparatus 20A, the CPU 11 of the terminal apparatus 20A requests the terminal apparatus 20B, which is the nearby apparatus, to change the pick up sensitivity level of the microphone or the output intensity level of the loudspeaker to prevent or reduce generation of a howl.

For example, in the example of control depicted in FIG. 15, the pick up sensitivity level of the microphone of the terminal apparatus 20A is 8, and the output intensity level of the loudspeaker of the terminal apparatus 20B is 10. Consequently, it is determined that a howl is likely to occur. In this case, the CPU 11 of the terminal apparatus 20A transmits to the terminal apparatus 20B a request to change the output intensity level of the loudspeaker to 4 or lower via the near-field wireless communication channel. Then, the terminal apparatus 20B prevents or reduces generation of a howl by lowering the output intensity level of the loudspeaker of the terminal apparatus 20B, for example, from 10 to 4.

When generation of a howl is prevented or reduced by adjusting the pick up sensitivity level of a microphone or the output intensity level of a loudspeaker, it is also possible to perform level adjustment on both the terminal apparatus 20A and a terminal apparatus other than the terminal apparatus 20A to prevent or reduce generation of a howl. FIG. 16 depicts an example of control in such a case.

When performing level adjustment on both the terminal apparatus 20A and a terminal apparatus other than the terminal apparatus 20A to prevent or reduce generation of a howl in this way, the CPU 11 of the terminal apparatus 20A not only requests the terminal apparatus 20B, which is the nearby apparatus, to change the pick up sensitivity level of the microphone or the output intensity level of the loudspeaker but also changes the pick up sensitivity level of the microphone or the output intensity level of the loudspeaker of the terminal apparatus 20A.

For example, in the example of control depicted in FIG. 16, the pick up sensitivity level of the microphone of the terminal apparatus 20A is 8, and the output intensity level of the loudspeaker of the terminal apparatus 20B is 10. Consequently, it is determined that a howl is likely to occur. In this case, the CPU 11 of the terminal apparatus 20A transmits to the terminal apparatus 20B a request to change the output intensity level of the loudspeaker to 6 or lower via the near-field wireless communication channel. Then, the terminal apparatus 20B performs control to lower the output intensity level of the loudspeaker of the terminal apparatus 20B, for example, from 10 to 6. Further, the CPU 11 of the terminal apparatus 20A lowers the pick up sensitivity level of the microphone of the terminal apparatus 20A from 8 to 5. In this way, generation of a howl is prevented or reduced by adjusting the pick up sensitivity level of a microphone and the output intensity level of a loudspeaker for both the apparatuses.

Next, description will be given with reference to FIGS. 17 and 18 with regard to an example of a specific control pattern in an actual usage condition.

First, description will be given with regard to a case where the two terminal apparatuses 20A and 20B are located in close proximity to each other in the same meeting room as depicted in FIG. 17.

It is assumed in FIG. 17 that the loudspeaker of the terminal apparatus 20A is inactive and that the microphone of the terminal apparatus 20A is initially inactive but is changed to active during operation with the pick up sensitivity level equal to 9. It is also assumed that the loudspeaker of the terminal apparatus 20B is active with the output intensity level equal to 10 and that the microphone of the terminal apparatus 20B is active with the pick up sensitivity level equal to 10.

FIG. 18 depicts types of processing to be selected to prevent or reduce a howl in various cases in such a condition as is depicted in FIG. 17. A type of processing for preventing or reducing a howl is selected as depicted in FIG. 18, for example, by presenting a selection screen to a user when it is determined that a howl is likely to occur and allowing the user, who views the selection screen, to select one of the alternatives "prioritize the setting on this terminal apparatus", "prioritize the setting on the other terminal apparatus", and "change the states of both this terminal apparatus and the other terminal apparatus".

Case 1 indicates, for example, a situation in which the user selects the alternative "prioritize the setting on the other terminal apparatus" and the setting on the terminal apparatus 20B gets high priority. In Case 1, generation of a howl is prevented or reduced by lowering the pick up sensitivity level of the microphone of the terminal apparatus 20A from 9 to 2.

Case 2 indicates, for example, a situation in which the user selects the alternative "prioritize the setting on this terminal apparatus" and the setting on the terminal apparatus 20A, which is the terminal apparatus used by the user, gets high priority. In Case 2, a request to change the output intensity level of the loudspeaker to 3 or lower is transmitted by the terminal apparatus 20A to the terminal apparatus 20B. As a result, the terminal apparatus 20B performs control to lower the output intensity level of the loudspeaker from 10 to 3.

Further, Case 3 indicates, for example, a situation in which the user selects the alternative "change the states of both this terminal apparatus and the other terminal apparatus" and the setting on the terminal apparatus 20A, which is the terminal apparatus used by the user, and the setting on the terminal apparatus 20B, which is the other terminal apparatus, are both changed. In Case 3, not only the pick up sensitivity level of the microphone of the terminal apparatus 20A is lowered from 9 to 4 but also a request to change the output intensity level of the loudspeaker to 5 or lower is transmitted by the terminal apparatus 20A to the terminal apparatus 20B. As a result, the terminal apparatus 20B performs control to lower the output intensity level of the loudspeaker from 10 to 5. In this way, level adjustment is performed on both the terminal apparatuses 20A and 20B, and generation of a howl is prevented or reduced.

The control for preventing or reducing generation of a howl caused by the two terminal apparatuses 20 has been described above. Description will be given below with regard to the control for preventing or reducing generation of a howl caused by three or more terminal apparatuses 20 being located in close proximity to each other.

For example, when generation of a howl is to be prevented or reduced for three or more terminal apparatuses 20, the processing for preventing or reducing generation of a howl in step S107 in the flowchart depicted in FIG. 9 is performed as depicted by the flowchart in FIG. 19.

In step S301, the CPU 11 of the terminal apparatus 20A first determines whether to prioritize the setting on a terminal apparatus other than the terminal apparatus 20A or prioritize the setting on the terminal apparatus 20A. Prioritizing the setting specifically means prioritizing the state of a loudspeaker or the state of a microphone.

If the CPU 11 of the terminal apparatus 20A has determined in step S301 to prioritize the setting on a terminal apparatus other than the terminal apparatus 20A, the CPU 11 of the terminal apparatus 20A prevents or reduces generation of a howl by changing the state of the microphone or the state of the loudspeaker of the terminal apparatus 20A to inactive in step S302.

If the CPU 11 of the terminal apparatus 20A has determined in step S301 not to prioritize the setting on a terminal apparatus other than the terminal apparatus 20A, the CPU 11 of the terminal apparatus 20A determines in step S303 whether to change the settings on all the terminal apparatuses. It is assumed that whether to change the settings on all the terminal apparatuses or change the setting only on a terminal apparatus most likely to generate a howl has been selected and set in advance.

If the CPU 11 of the terminal apparatus 20A has determined in step S303 to change the settings on all the terminal apparatuses, the CPU 11 of the terminal apparatus 20A requests in step S304 that all the other terminal apparatuses, from which an advertisement signal has been received, change the state of the microphone or the state of the loudspeaker.

If the CPU 11 of the terminal apparatus 20A has not determined in step S303 to change the settings on all the terminal apparatuses, that is, has determined to change the setting only on another terminal apparatus most likely to generate a howl, the CPU 11 of the terminal apparatus 20A requests in step S305 that the other apparatus most likely to generate a howl change the state of the microphone or the state of the loudspeaker.

Next, description will be given with reference to FIGS. 20 and 21 with regard to an example of a specific control pattern in an actual usage condition when three terminal apparatuses are located in close proximity to each other.

First, description will be given with regard to a case where the three terminal apparatuses 20A to 20C are located in close proximity to each other in a location such as the same meeting room as depicted in FIG. 20.

It is assumed in FIG. 20 that the loudspeaker of the terminal apparatus 20A is inactive and that the microphone of the terminal apparatus 20A is initially inactive but is changed to active during operation with the pick up sensitivity level equal to 9. It is also assumed that the loudspeakers of the terminal apparatuses 20B and 20C are active with the output intensity level equal to 10 and that the microphones of the terminal apparatuses 20B and 20C are active with the pick up sensitivity level equal to 10.

Description will be given on the assumption that a howl is not generated by the terminal apparatuses 20B and 20C. It is also assumed that a howl is more probably generated by the terminal apparatuses 20A and 20B than by the terminal apparatuses 20A and 20C because the terminal apparatus 20B is located closer to the terminal apparatus 20A than the terminal apparatus 20C is. In addition, description will be given on the assumption that the probability that a howl is generated by the terminal apparatuses 20A and 20C is not zero but relatively low.

FIG. 21 depicts types of processing to be selected to prevent or reduce a howl in various cases in such a condition as is depicted in FIG. 20. A type of processing for preventing or reducing a howl is selected as depicted in FIG. 21, for example, by presenting a selection screen to a user when it is determined that a howl is likely to occur and allowing the user, who views the selection screen, to select one of the alternatives "prioritize the setting on this terminal apparatus (change the setting only on a terminal apparatus most likely to generate a howl)", "prioritize the setting on this terminal apparatus (change the settings on all the other terminal apparatuses)", "prioritize the settings on the other terminal apparatuses", and "change the states of this terminal apparatus and all the other terminal apparatuses".

Case 1 indicates, for example, a situation in which the user selects the alternative "prioritize the settings on the other terminal apparatuses" and the settings on the terminal apparatuses 20B and 20C get high priority. In Case 1, generation of a howl is prevented or reduced by lowering the pick up sensitivity level of the microphone of the terminal apparatus 20A from 9 to 2.

Case 2 indicates, for example, a situation in which the user selects the alternative "prioritize the setting on this terminal apparatus (change the setting only on a terminal apparatus most likely to generate a howl)" and the setting on the terminal apparatus 20A, which is the terminal apparatus used by the user, gets high priority. In Case 2, a request to change the output intensity level of the loudspeaker to 3 or lower is transmitted by the terminal apparatus 20A to the terminal apparatus 20B. As a result, the terminal apparatus 20B performs control to lower the output intensity level of the loudspeaker from 10 to 3.

Case 3 indicates, for example, a situation in which the user selects the alternative "prioritize the setting on this terminal apparatus (change the settings on all the other terminal apparatuses)" and the setting on the terminal apparatus 20A, which is the terminal apparatus used by the user, gets high priority. In Case 3, a request to change the output intensity level of the loudspeaker to 4 or lower is transmitted by the terminal apparatus 20A to each of the terminal apparatuses 20B and 20C. As a result, the terminal apparatuses 20B and 20C each perform control to lower the output intensity level of the loudspeaker from 10 to 4.

Further, Case 4 indicates, for example, a situation in which the user selects the alternative "change the states of this terminal apparatus and all the other terminal apparatuses" and the setting on the terminal apparatus 20A, which is the terminal apparatus used by the user, and the settings on the terminal apparatuses 20B and 20C, which are the other terminal apparatuses, are all changed. In Case 4, not only the pick up sensitivity level of the microphone of the terminal apparatus 20A is lowered from 9 to 3 but also a request to change the output intensity level of the loudspeaker to 5 or lower is transmitted by the terminal apparatus 20A to each of the terminal apparatuses 20B and 20C. As a result, the terminal apparatuses 20B and 20C each perform control to lower the output intensity level of the loudspeaker from 10 to 5. In this way, level adjustment is performed on all the terminal apparatuses 20A, 20B, and 20C, and generation of a howl is prevented or reduced.

In the exemplary embodiment described above, description has been given with regard to the cases where the output intensity of a loudspeaker and the pick up sensitivity of a microphone are set by using relative values such as the output intensity level and the pick up sensitivity level. The present disclosure may similarly be applied to a case where the output intensity of a loudspeaker and the pick up sensitivity of a microphone are set by using absolute values such as a sound pressure level (SPL) measured in dB.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A non-transitory computer readable medium storing a program causing a computer to execute a process, the computer being included in a first information processing apparatus, the process comprising:
    (a) receiving notifications via a wireless communication channel from one or more information processing apparatuses other than the first information processing apparatus, each notification including conference identification information and information regarding a state of a sound-pick-up unit or a state of a sound-output unit of one of the one or more information processing apparatuses, the conference identification information identifying a teleconference to which the one of the one or more information processing apparatuses is to connect;
    (b) identifying an information processing apparatus as a nearby apparatus, the information processing apparatus being selected from the one or more information processing apparatuses that have transmitted the notifications received by the first information processing apparatus, the information processing apparatus having transmitted a notification including conference identification information that is the same as conference identification information of a teleconference to which the first information processing apparatus is to connect, the information processing apparatus being located at a distance from the first information processing apparatus, the distance being shorter than a predetermined distance; and
    (c) determining whether a howl is likely to occur by comparing a state of a sound-pick-up unit of the nearby apparatus that has been identified and a state of a sound-output unit of the first information processing apparatus or comparing a state of a sound-output unit of the nearby apparatus that has been identified and a state of a sound-pick-up unit of the first information processing apparatus.

2. The non-transitory computer readable medium storing the program according to claim 1,
    wherein the program is configured to cause the computer to further execute, if it is determined in step (c) that a howl is likely to occur, warning that a howl is likely to occur.

3. The non-transitory computer readable medium storing the program according to claim 2,
    wherein information regarding a state of a sound-pick-up unit includes information indicating whether that sound-pick-up unit is active or inactive,
    information regarding a state of a sound-output unit includes information indicating whether that sound-output unit is active or inactive, and
    it is determined in step (c) that a howl is likely to occur if the sound-pick-up unit of the nearby apparatus that has been identified and the sound-output unit of the first information processing apparatus are both active or the sound-output unit of the nearby apparatus that has been identified and the sound-pick-up unit of the first information processing apparatus are both active.

4. The non-transitory computer readable medium storing the program according to claim 3,
    wherein the program is configured to cause the computer to further execute, if it is determined in step (c) that a howl is likely to occur, preventing or reducing generation of a howl by changing the state of the sound-pick-up unit or the state of the sound-output unit of the first information processing apparatus to inactive.

5. The non-transitory computer readable medium storing the program according to claim 3,
wherein the program is configured to cause the computer to further execute, if it is determined in step (c) that a howl is likely to occur, requesting the nearby apparatus to prevent or reduce generation of a howl by changing the state of the sound-pick-up unit or the sound-output unit of the nearby apparatus to inactive.

6. The non-transitory computer readable medium storing the program according to claim 2,
wherein information regarding a state of a sound-pick-up unit includes information indicating pick up sensitivity of that sound-pick-up unit,
information regarding a state of a sound-output unit includes information indicating output intensity of that sound-output unit, and
it is determined in step (c) whether a howl is likely to occur, the determination being based on a relationship between pick up sensitivity of the sound-pick-up unit of the nearby apparatus that has been identified and output intensity of the sound-output unit of the first information processing apparatus or a relationship between output intensity of the sound-output unit of the nearby apparatus that has been identified and pick up sensitivity of the sound-pick-up unit of the first information processing apparatus.

7. The non-transitory computer readable medium storing the program according to claim 1,
wherein information regarding a state of a sound-pick-up unit includes information indicating whether that sound-pick-up unit is active or inactive,
information regarding a state of a sound-output unit includes information indicating whether that sound-output unit is active or inactive, and
it is determined in step (c) that a howl is likely to occur if the sound-pick-up unit of the nearby apparatus that has been identified and the sound-output unit of the first information processing apparatus are both active or the sound-output unit of the nearby apparatus that has been identified and the sound-pick-up unit of the first information processing apparatus are both active.

8. The non-transitory computer readable medium storing the program according to claim 7,
wherein the program is configured to cause the computer to further execute, if it is determined in step (c) that a howl is likely to occur, preventing or reducing generation of a howl by changing the state of the sound-pick-up unit or the state of the sound-output unit of the first information processing apparatus to inactive.

9. The non-transitory computer readable medium storing the program according to claim 7,
wherein the program is configured to cause the computer to further execute, if it is determined in step (c) that a howl is likely to occur, requesting the nearby apparatus to prevent or reduce generation of a howl by changing the state of the sound-pick-up unit or the sound-output unit of the nearby apparatus to inactive.

10. The non-transitory computer readable medium storing the program according to claim 1,
wherein information regarding a state of a sound-pick-up unit includes information indicating pick up sensitivity of that sound-pick-up unit,
information regarding a state of a sound-output unit includes information indicating output intensity of that sound-output unit, and
it is determined in step (c) whether a howl is likely to occur, the determination being based on a relationship between pick up sensitivity of the sound-pick-up unit of the nearby apparatus that has been identified and output intensity of the sound-output unit of the first information processing apparatus or a relationship between output intensity of the sound-output unit of the nearby apparatus that has been identified and pick up sensitivity of the sound-pick-up unit of the first information processing apparatus.

11. The non-transitory computer readable medium storing the program according to claim 10,
wherein the program is configured to cause the computer to further execute, if it is determined in step (c) that a howl is likely to occur, preventing or reducing generation of a howl by changing the pick up sensitivity of the sound-pick-up unit or the output intensity of the sound-output unit of the first information processing apparatus.

12. The non-transitory computer readable medium storing the program according to claim 10,
wherein the program is configured to cause the computer to further execute, if it is determined in step (c) that a howl is likely to occur, requesting the nearby apparatus to prevent or reduce generation of a howl by changing the pick up sensitivity of the sound-pick-up unit or the output intensity of the sound-output unit of the nearby apparatus.

13. The non-transitory computer readable medium storing the program according to claim 1,
wherein in step (b), the information processing apparatus is identified as being located at the distance from the first information processing apparatus, the distance being shorter than the predetermined distance, if intensity of an electromagnetic wave that is received from the information processing apparatus in the wireless communication channel is lower than a predetermined threshold.

14. The non-transitory computer readable medium storing the program according to claim 1,
wherein the program is configured to cause the computer to further execute, if it is determined in step (c) that a howl is likely to occur, preventing or reducing generation of a howl by selecting whether to change the state of the sound-pick-up unit or the state of the sound-output unit of the first information processing apparatus or whether to change the state of the sound-pick-up unit or the state of the sound-output unit of the nearby apparatus.

15. The non-transitory computer readable medium storing the program according to claim 14,
wherein in the preventing or reducing, generation of a howl is prevented or reduced by prioritizing the first information processing apparatus or the nearby apparatus, whichever has more recently changed the state of the sound-pick-up unit or the state of the sound-output unit thereof, and changing the state of the sound-pick-up unit or the state of the sound-output unit of an information processing apparatus that gets lower priority.

16. The non-transitory computer readable medium storing the program according to claim 14,
wherein in the preventing or reducing, generation of a howl is prevented or reduced by prioritizing the first information processing apparatus or the nearby apparatus, whichever has a higher priority level assigned in advance, and changing the state of the sound-pick-up unit or the state of the sound-output unit of an information processing apparatus assigned a lower priority level.

17. The non-transitory computer readable medium storing the program according to claim 14,
wherein in the preventing or reducing, generation of a howl is prevented or reduced by identifying the first information processing apparatus or the nearby apparatus, whichever is to be prioritized, based on characteristic information regarding a sound-pick-up unit being used or characteristic information regarding a sound-output unit being used and changing the state of the sound-pick-up unit or the state of the sound-output unit of an information processing apparatus that gets lower priority.

18. The non-transitory computer readable medium storing the program according to claim 17,
wherein in the preventing or reducing, generation of a howl is prevented or reduced by identifying as the information processing apparatus to be prioritized the first information processing apparatus or the nearby apparatus, whichever uses a sound-pick-up unit externally connected or a sound-output unit externally connected, and changing the state of the sound-pick-up unit or the state of the sound-output unit of an information processing apparatus that gets lower priority.

19. An information processing apparatus comprising:
a processor configured to:
receive notifications via a wireless communication channel from one or more information processing apparatuses other than the information processing apparatus being referred to as a first information processing apparatus, each notification including conference identification information and information regarding a state of a sound-pick-up unit or a state of a sound-output unit of one of the one or more information processing apparatuses, the conference identification information identifying a teleconference to which the one of the one or more information processing apparatuses is to connect;
identify an information processing apparatus as a nearby apparatus, the information processing apparatus being selected from the one or more information processing apparatuses that have transmitted the notifications received by the first information processing apparatus, the information processing apparatus having transmitted a notification including conference identification information that is the same as conference identification information of a teleconference to which the first information processing apparatus is to connect, the information processing apparatus being located at a distance from the first information processing apparatus, the distance being shorter than a predetermined distance; and
determine whether a howl is likely to occur by comparing a state of a sound-pick-up unit of the nearby apparatus that has been identified and a state of a sound-output unit of the first information processing apparatus or comparing a state of a sound-output unit of the nearby apparatus that has been identified and a state of a sound-pick-up unit of the first information processing apparatus.

20. An information processing method comprising:
receiving notifications by a first information processing apparatus via a wireless communication channel from one or more information processing apparatuses other than the first information processing apparatus, each notification including conference identification information and information regarding a state of a sound-pick-up unit or a state of a sound-output unit of one of the one or more information processing apparatuses, the conference identification information identifying a teleconference to which the one of the one or more information processing apparatuses is to connect;
identifying an information processing apparatus as a nearby apparatus, the information processing apparatus being selected from the one or more information processing apparatuses that have transmitted the notifications received by the first information processing apparatus, the information processing apparatus having transmitted a notification including conference identification information that is the same as conference identification information of a teleconference to which the first information processing apparatus is to connect, the information processing apparatus being located at a distance from the first information processing apparatus, the distance being shorter than a predetermined distance; and
determining whether a howl is likely to occur by comparing a state of a sound-pick-up unit of the nearby apparatus that has been identified and a state of a sound-output unit of the first information processing apparatus or comparing a state of a sound-output unit of the nearby apparatus that has been identified and a state of a sound-pick-up unit of the first information processing apparatus.

* * * * *